(12) United States Patent
Okaue et al.

(10) Patent No.: US 8,402,240 B2
(45) Date of Patent: *Mar. 19, 2013

(54) SYSTEMS AND METHODS FOR LOCKING AND EXPORTING THE LOCKING OF A REMOVABLE MEMORY DEVICE

(75) Inventors: Takumi Okaue, Tokyo (JP); Kenichi Nakanishi, Tokyo (JP); Jun Tashiro, Kanagawa (JP); Hideaki Okubo, Saitama (JP)

(73) Assignee: Sony Corporation, Tokyo (JP)

( * ) Notice: Subject to any disclaimer, the term of this patent is extended or adjusted under 35 U.S.C. 154(b) by 615 days.

This patent is subject to a terminal disclaimer.

(21) Appl. No.: 12/612,706

(22) Filed: Nov. 5, 2009

(65) Prior Publication Data

US 2010/0049993 A1 Feb. 25, 2010

Related U.S. Application Data

(63) Continuation of application No. 10/486,094, filed on Feb. 6, 2004, now Pat. No. 7,636,826.

(30) Foreign Application Priority Data

Jun. 25, 2002 (JP) ................. P2002-183882

(51) Int. Cl.
*G06F 12/14* (2006.01)
*G06F 12/00* (2006.01)

(52) U.S. Cl. ............. 711/163; 711/164; 726/27; 726/29

(58) Field of Classification Search .................. 711/163, 711/164; 726/27, 29
See application file for complete search history.

(56) References Cited

U.S. PATENT DOCUMENTS

| 3,602,896 | A | 8/1971 | Zeheb |
| 4,405,829 | A | 9/1983 | Rivest et al. |
| 4,736,419 | A | 4/1988 | Roe |
| 4,817,140 | A | 3/1989 | Chandra et al. |
| 4,937,736 | A | 6/1990 | Chang et al. |
| 5,148,534 | A | 9/1992 | Comerford |
| 5,231,310 | A | 7/1993 | Oh |
| 5,231,668 | A | 7/1993 | Kravitz |
| 5,282,247 | A | 1/1994 | McLean et al. |
| 5,287,519 | A | 2/1994 | Dayan et al. |
| 5,293,424 | A | 3/1994 | Holtey et al. |
| 5,623,637 | A | 4/1997 | Jones et al. |

(Continued)

FOREIGN PATENT DOCUMENTS

| EP | 1205405 | 5/2002 |
| JP | 04-139552 | 5/1992 |

(Continued)

OTHER PUBLICATIONS

Tanenbaum, A. S., Structured Computer Organization, 1984, Prentice Hall Inc., 2nd. ed. pp. 10-12.

(Continued)

*Primary Examiner* — Yaima Campos
*Assistant Examiner* — Samuel Dillon
(74) *Attorney, Agent, or Firm* — SNR Denton US LLP

(57) ABSTRACT

A device and method is provided for commonly and securely allowing, as access control on a memory card, a plurality of information processing apparatuses to lock/unlock the memory. On the basis of a lock command input from an information processing apparatus serving as a host, such as a PC, an information storage device, such as a memory card, determines whether (a) a standard lock key set serving as a key set prohibiting output or (b) an export lock key set serving as a key set permitting output is detected and stores corresponding key set information. Only when the export lock key set is detected, output is permitted provided that predetermined verification succeeds.

13 Claims, 24 Drawing Sheets

U.S. PATENT DOCUMENTS

| | | |
|---|---|---|
| 5,638,448 A | 6/1997 | Nguyen |
| 5,857,021 A | 1/1999 | Kataoka |
| 5,963,142 A | 10/1999 | Zinsky et al. |
| 6,002,772 A | 12/1999 | Saito |
| 6,012,145 A | 1/2000 | Mathers et al. |
| 6,131,090 A | 10/2000 | Basso et al. |
| 6,169,687 B1 | 1/2001 | Johnson |
| 6,330,624 B1 | 12/2001 | Cromer et al. |
| 6,832,317 B1 | 12/2004 | Strongin et al. |
| 2002/0002654 A1 | 1/2002 | Tomohiro |
| 2002/0040423 A1 | 4/2002 | Okaue |
| 2003/0041221 A1 | 2/2003 | Okada et al. |
| 2003/0135507 A1 | 7/2003 | Hind et al. |

FOREIGN PATENT DOCUMENTS

| | | |
|---|---|---|
| JP | 05-113932 | 5/1993 |
| JP | 09-134330 | 5/1997 |
| JP | 09-293022 | 11/1997 |
| JP | 11-237983 | 8/1999 |
| JP | 11-265318 | 9/1999 |
| JP | 2001-022642 | 1/2001 |
| JP | 2001-092718 | 4/2001 |
| JP | 2001-195551 | 7/2001 |
| JP | 2001-236333 | 8/2001 |
| JP | 2002-108713 | 4/2002 |
| JP | 2002-108714 | 4/2002 |

OTHER PUBLICATIONS

NIST. Digital Signature Standard (DSS); May 19, 1994; Federal Information Processing Standards Publication 186.

RSA Laboratories, PKCS, 12 v1.0 Personal Information Exchange Syntax, Jun. 24, 1999, RSA Data Security Inc.

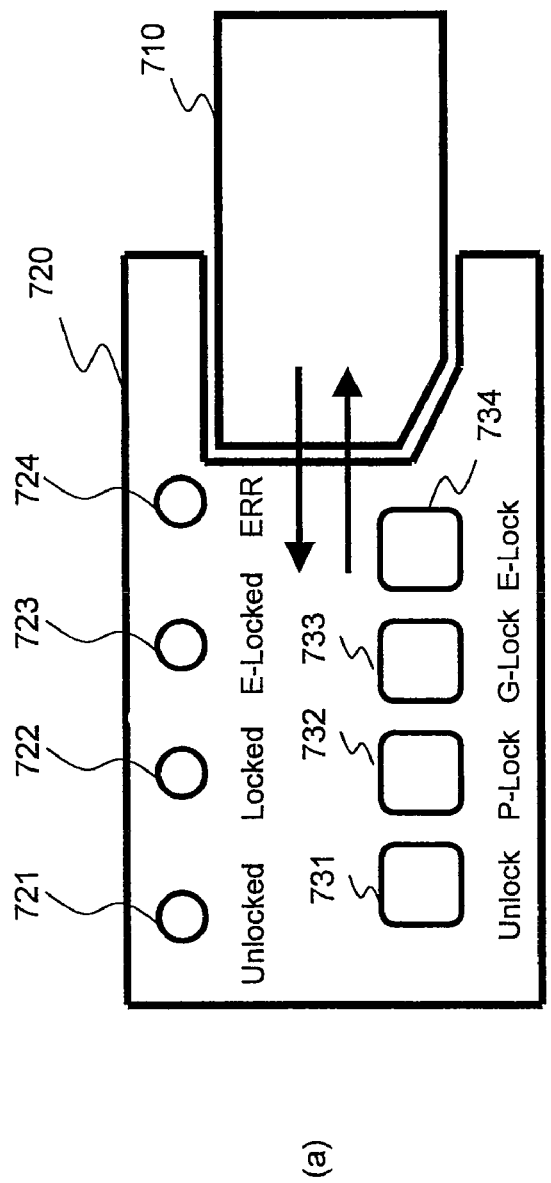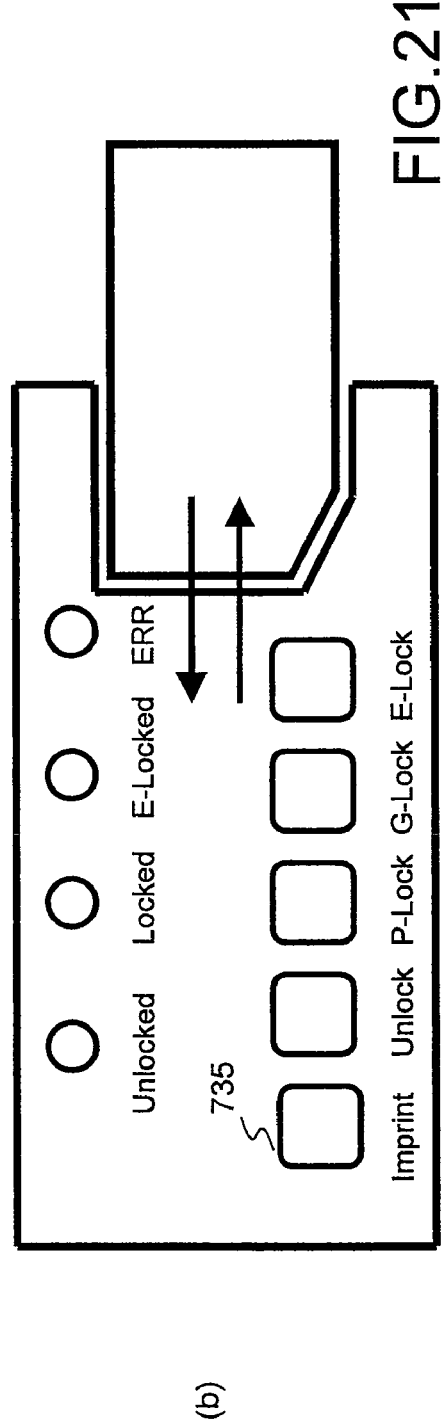
FIG.21

SYSTEMS AND METHODS FOR LOCKING AND EXPORTING THE LOCKING OF A REMOVABLE MEMORY DEVICE

CROSS REFERENCE TO RELATED APPLICATIONS

The present application is a continuation of U.S. Ser. No. 10/486,094 filed Feb. 6, 2004 which is a U.S. national stage application based on PCT/JP03/07781 filed Jun. 19, 2003 and which claims priority from Japanese Patent Application No. 2002-183882 filed Jun. 25, 2002, all of which are incorporated herein by reference to the extent permitted by law.

TECHNICAL FIELD

The present invention relates to information storage devices, memory access control systems and methods, and computer programs. More particularly, the present invention relates to an information storage device, such as a memory card, for implementing access control in various modes relative to data stored in the information storage device and for commonly allowing a plurality of information processing apparatuses that use the information storage device to lock or unlock a memory in the information storage device, to a memory access control system and method, and to a computer program.

BACKGROUND ART

Various information processing apparatuses, such as PCs (Personal Computers), PDAs (Personal Digital Assistants), digital cameras, data readers/writers, and game machines, read and write data using various storage media, such as hard disks, DVDs, CDs, and memory cards.

Nowadays, small card-type memory devices, each including a memory such as a flash memory or the like and a controller such as a CPU or the like, are widely used as storage means for storing various types of software data (content), such as music data, image data, and programs.

Reading of data stored on a memory card or the like or writing of data to such a memory card is done by placing the card in a unit with a memory card interface and transferring data via the interface. Data reading and writing using a memory device may be done by anyone without permission. Alternatively, a so-called access control scheme is implemented by, for example, setting a password or performing encryption so that only a specific user or a specific unit is permitted to access the memory, whereas a third-party user who does not have permission is denied access to the memory.

For example, a password known only to a user who has access permission is generated. This password is transferred from a content-using unit serving as an information reader to a content storage unit, such as a memory card. A controller (CPU or the like) of the memory card verifies the password and, only if the verification succeeds, content is output from the content storage unit, such as the memory card, to the content-using unit serving as the information reader. Alternatively, mutual authentication is performed between the content-using unit serving as the information reader and the content storage unit, such as the memory card. Only if the mutual authentication succeeds, content is output from the content storage unit, such as the memory card, to the content-using unit serving as the information reader.

DISCLOSURE OF INVENTION

There are various architectures that allow data access only after verification of data (content) usage permission.

A data storage device, such as a memory card, can be placed in various units including a PC, a PDA, and digital camera. In many cases, these units share one memory card. In such a data usage architecture, when the above-described password verification or authentication is requested every time the memory card is placed in one of these units, it takes time until it becomes ready to read or write data. The processing efficiency is thus reduced.

In view of the foregoing problems, it is an object of the present invention to provide an information storage device, such as a memory card, for implementing access control in various modes relative to data stored in the information storage device and for commonly and securely allowing a plurality of information processing apparatuses that use the information storage device to lock or unlock a memory in the information storage device, to a memory access control system and method, and to a computer program.

According to a first aspect of the present invention, there is provided an information storage device including a memory for storing data and a controller for performing access control on the memory.

The controller performs locking of the memory on the basis of a lock command and an identifier (ID) input from an information processing apparatus.

The controller determines, on the basis of the lock command, whether a key set including the identifier (ID) is (a) a standard lock key set serving as a key set prohibiting output, or (b) an export lock key set serving as a key set permitting output, and stores determination information in storage means.

In one mode of the information storage device of the present invention, the information storage device stores lock status information in the storage means, the lock status information serving as determination information based on which the lock status of the information storage device is determined. The lock status information includes information based on which it is determined whether the information storage device is standard-locked or export-locked. The controller outputs, on the basis of the lock status information, the export lock key set to the information processing apparatus provided that it is determined that the information storage device is export-locked.

In one mode of the information storage device of the present invention, the controller determines whether it is permitted to output the export lock key set to the information processing apparatus. The determination includes verification of a key set unique to the information processing apparatus, which is input from the information processing apparatus, and the export lock key set is output to the information processing apparatus at least provided that the verification succeeds.

In one mode of the information storage device of the present invention, the key set unique to the information processing apparatus is a primary key set [IDs, LKs] consisting of a primary ID (IDs) serving as a unique ID of the information processing apparatus and a primary lock key (LKs) serving as a lock key associated with the unique ID. The information storage device has a lock master key (LMK) that is applicable to compute the primary lock key (LKs), which is a hash value based on the relationship LKs=H(LMK, IDs), the hash value being computed for the primary ID (IDs) by applying the lock master key (LMK). The controller verifies the key set unique to the information processing apparatus, which is input from the information processing apparatus, on the basis of a lock key (LK) obtained by computing the hash value by applying the lock master key (LMK).

In one mode of the information storage device of the present invention, the controller generates a random number and receives, from the information processing apparatus, encrypted data [E(Lks, Rms)] generated by encrypting the random number (Rms) on the basis of the primary lock key (LKs) held by the information processing apparatus. The controller performs verification including checking of the received encrypted data against encrypted data [E(Lks, Rms)] computed on the basis of the primary lock key (LKs) obtained by computing the hash value.

In one mode of the information storage device of the present invention, the information processing apparatus has, serving as a unique key set, a primary key set [IDs, LKs] consisting of a primary ID (IDs) serving as a unique ID of the information processing apparatus and a primary lock key (LKs) defined in association with the primary ID (IDs). In response to an export-lock-key-set output request from the information processing apparatus, the controller encrypts data of the export lock key set on the basis of the primary lock key (LKs) held by the information processing apparatus and outputs the encrypted data.

In one mode of the information storage device of the present invention, the export lock key set is a sub key set [IDen, LKen] consisting of a data set of a sub ID (IDen) input from the information processing apparatus having performed export locking and a sub lock key (LKen) defined in association with the sub ID (IDen). The controller encrypts the sub lock key (LKen) on the basis of the primary lock key (LKs) held by the information processing apparatus having made a sub-key-set output request and outputs encrypted data [E(LKs, LKen)].

According to a second aspect of the present invention, there is provided a memory access control system including an information storage device including a memory for storing data and a controller for performing access control on the memory and an information processing apparatus including an interface with the information storage device and accessing the memory in the information storage device via the interface.

The information processing apparatus stores a key set including an identifier (ID) and a lock key (LK) in storage means.

The controller of the information storage device performs locking of the memory on the basis of a lock command and the identifier (ID) input from the information processing apparatus.

The controller of the information storage device determines, on the basis of the lock command, whether the key set including the identifier (ID) is (a) a standard lock key set serving as a key set prohibiting output, or (b) an export lock key set serving as a key set permitting output, and stores determination information in storage means.

On the basis of the determination information, the controller of the information storage device determines whether it is permitted to output the key set to the information processing apparatus.

In one mode of the memory access control system of the present invention, the information processing apparatus stores a primary key set [IDs, LKs] consisting of a primary ID (IDs) serving as a unique ID of the information processing apparatus and a primary lock key (LKs) serving as a lock key associated with the unique ID in the storage means. The information storage device has a lock master key (LMK) that is applicable to compute the primary lock key (LKs), which is a hash value based on the relationship LKs=H(LMK, IDs), the hash value being computed for the primary ID (IDs) by applying the lock master key (LMK). The controller of the information storage device verifies a key set unique to the information processing apparatus, which is input from the information processing apparatus, on the basis of a lock key (LK) obtained by computing the hash value by applying the lock master key (LMK).

In one mode of the memory access control system of the present invention, the controller of the information storage device generates a random number and receives, from the information processing apparatus, encrypted data [E(Lks, Rms)] generated by encrypting the random number (Rms) on the basis of a primary lock key (LKs) held by the information processing apparatus. The controller of the information storage device performs verification including checking of the received encrypted data against encrypted data [E(Lks, Rms)] computed on the basis of a primary lock key (LKs) obtained by computing a hash value.

In one mode of the memory access control system of the present invention, the information processing apparatus has, serving as a unique key set, a primary key set [IDs, LKs] consisting of a primary ID (IDs) serving as a unique ID of the information processing apparatus and a primary lock key (LKs) defined in association with the primary ID (IDs). In response to an export-lock-key-set output request from the information processing apparatus, the controller of the information storage device encrypts data of the export lock key set on the basis of the primary lock key (LKs) held by the information processing apparatus and outputs the encrypted data. The information processing apparatus obtains the data of the export lock key set by decrypting the encrypted data on the basis of the primary lock key (LKs) held by the information processing apparatus.

In one mode of the memory access control system of the present invention, the export lock key set is a sub key set [IDen, LKen] consisting of a data set of a sub ID (IDen) input from the information processing apparatus having performed export locking and a sub lock key (LKen) defined in association with the sub ID (IDen). The controller of the information storage device encrypts the sub lock key (LKen) on the basis of the primary lock key (LKs) held by the information processing apparatus having made a sub-key-set output request and outputs encrypted data [E(LKs, LKen)] to the information processing apparatus.

According to a third aspect of the present invention, there is provided a memory access control method for an information storage device including a memory for storing data and a controller for performing access control on the memory.

The method includes a step of receiving a lock command and an identifier (ID) input from an information processing apparatus; and a step of determining, on the basis of the lock command, whether a key set including the identifier (ID) is (a) a standard lock key set serving as a key set prohibiting output, or (b) an export lock key set serving as a key set permitting output, and storing determination information in storage means.

In one mode of the memory access control method of the present invention, the determination information is lock status information serving as lock-status determination information. The lock status information includes information based on which it is determined whether the information storage device is standard-locked or export-locked. The memory access control method further includes a step of outputting, on the basis of the lock status information, the export lock key set to the information processing apparatus provided that it is determined that the information storage device is export-locked.

In one mode of the memory access control method of the present invention, as determination of whether it is permitted to output the export lock key set to the information processing apparatus, verification is performed on a key set unique to the information processing apparatus, which is input from the information processing apparatus, and the export lock key set is output to the information processing apparatus at least provided that the verification succeeds.

In one mode of the memory access control method of the present invention, the key set unique to the information processing apparatus is a primary key set [IDs, LKs] consisting of a primary ID (IDs) serving as a unique ID of the information processing apparatus and a primary lock key (LKs) serving as a lock key associated with the unique ID. The information storage device has a lock master key (LMK) that is applicable to compute the primary lock key (LKs), which is a hash value based on the relationship LKs=H(LMK, IDs), the hash value being computed for the primary ID (IDs) by applying the lock master key (LMK). The verification includes a step of verifying the key set unique to the information processing apparatus, which is input from the information processing apparatus, on the basis of a lock key (LK) obtained by computing the hash value by applying the lock master key (LMK).

In one mode of the memory access control method of the present invention, the verification step includes a step of generating a random number, receiving, from the information processing apparatus, encrypted data [E(Lks, Rms)] generated by encrypting the random number (Rms) on the basis of the primary lock key (LKs) held by the information processing apparatus, and performing verification including checking of the received encrypted data against encrypted data [E(Lks, Rms)] computed on the basis of the primary lock key (LKs) obtained by computing the hash value.

In one mode of the memory access control method of the present invention, the information processing apparatus has, serving as a unique key set, a primary key set [IDs, LKs] consisting of a primary ID (IDs) serving as a unique ID of the information processing apparatus and a primary lock key (LKs) defined in association with the primary ID (IDs). The memory access control method further includes an encryption and output step of encrypting, in response to an export-lock-key-set output request from the information processing apparatus, data of the export lock key set on the basis of the primary lock key (LKs) held by the information processing apparatus and outputting the encrypted data.

In one mode of the memory access control method of the present invention, the export lock key set is a sub key set [IDen, LKen] consisting of a data set of a sub ID (IDen) input from the information processing apparatus having performed export locking and a sub lock key (LKen) defined in association with the sub ID (IDen). The encryption and output step is a step of encrypting the sub lock key (LKen) on the basis of the primary lock key (LKs) held by the information processing apparatus having made a sub-key-set output request and outputting encrypted data [E(LKs, LKen)].

According to a fourth aspect of the present invention, there is provided a computer program for performing memory access control on an information storage device including a memory for storing data and a controller for performing access control on the memory.

The program includes a step of receiving a lock command and an identifier (ID) input from an information processing apparatus; and a step of determining, on the basis of the lock command, whether a key set including the identifier (ID) is (a) a standard lock key set serving as a key set prohibiting output, or (b) an export lock key set serving as a key set permitting output, and storing determination information in storage means.

According to the structure of the present invention, in response to a lock command input from an information processing apparatus serving as a host, such as a PC, an information storage device, such as a memory card, determines whether (a) a standard lock key set serving as a key set prohibiting output or (b) an export lock key set serving as a key set permitting output is detected and stores corresponding key set information. Only when the export lock key set is detected, output is permitted provided that predetermined verification succeeds. Therefore, only a plurality of valid information processing apparatuses is allowed to lock or unlock the memory.

According to the structure of the present invention, memory access control is performed on the basis of lock status information based on which it is determined whether the information storage device is standard-locked or export-locked. Only when the information storage device is export-locked, the key set is output. Therefore, depending on the use of the memory, various types of memory access control can be performed.

According to the structure of the present invention, to output the export lock key set to the information processing apparatus, verification is performed on a key set unique to the information processing apparatus, which is input from the information processing apparatus. The key set is output provided that the verification succeeds. Therefore, unlimited memory access is prevented, and secure memory access control is achieved.

According to the structure of the present invention, a primary key set [IDs, LKs] consisting of a primary ID (IDs) serving as a unique ID of the information processing apparatus and a primary lock key (LKs) serving as a lock key associated with the unique ID and a sub key set [IDen, LKen] consisting of a data set of a sub ID (IDen) that can be used to perform export locking and a sub lock key (LKen) defined in association with the sub ID (IDen) are stored. Depending on a process, the key set to be applied is changed, thereby easily achieving memory access control in accordance with the process.

A computer program of the present invention is a computer program that can be provided on a storage medium, such as a CD, an FD, or an MO, or a communication medium, such as a network, for providing the computer program in a computer-readable format to a general computer system that can execute various program codes. By providing such a program in a computer-readable format, a process in accordance with the program is performed on the computer system.

Further objects, features, and advantages of the present invention will become apparent from the following detailed description of the embodiments of the present invention with reference to the attached drawings. The word "system" in the present specification refers to a logical set of a plurality of apparatuses, which are not necessarily contained in a single casing.

BRIEF DESCRIPTION OF THE DRAWINGS

FIG. 21 is an illustration describing the structure of a locking/unlocking unit for locking/unlocking the information storage device.

BEST MODE FOR CARRYING OUT THE INVENTION

With reference to the drawings, an information storage device and a memory access control process according to embodiments of the present invention will be described in detail.

Figure 1:
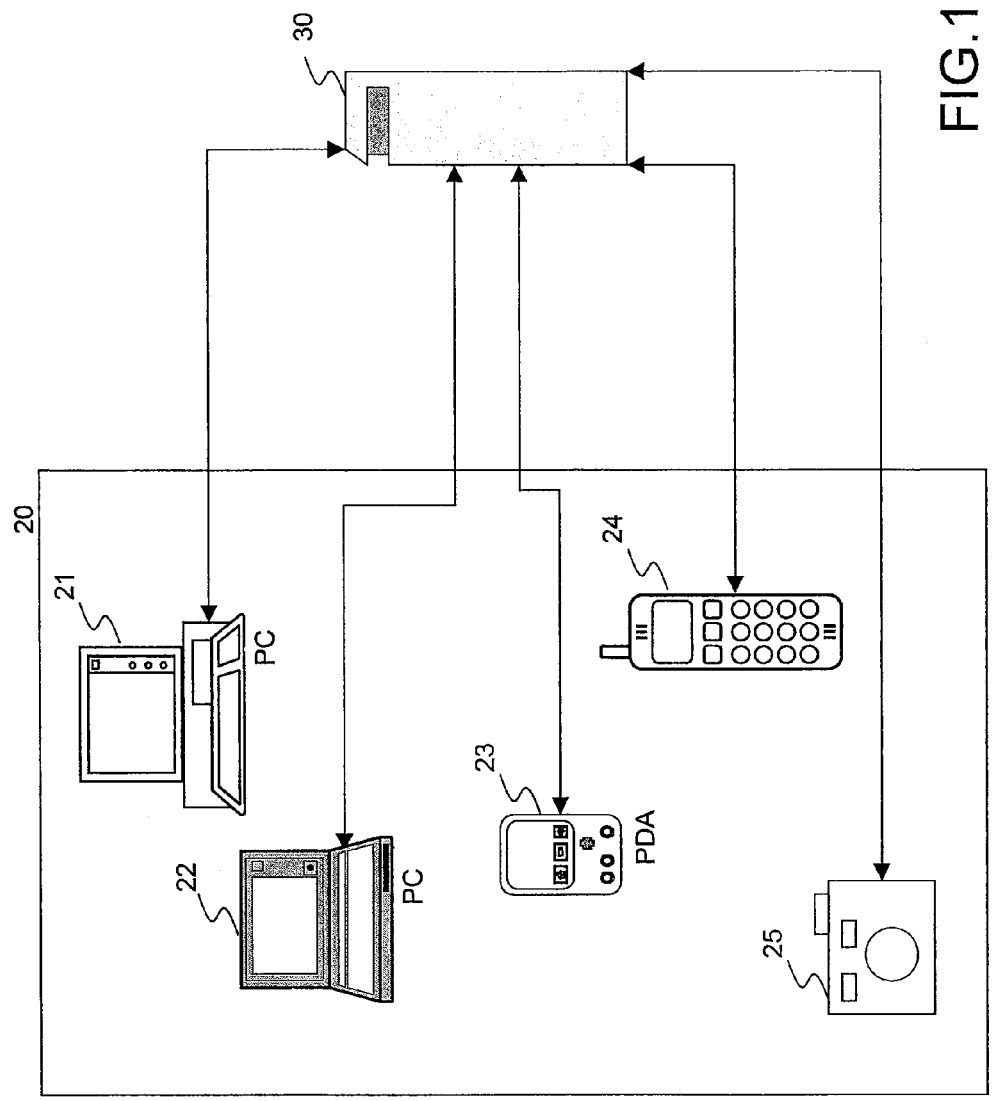
FIG. 1 is a schematic illustration describing the use of an information storage device of the present invention.

Referring to FIG. 1, use of data by applying an information storage device of the present invention will be described. Information processing apparatuses 20 include, for example, a PC (Personal Computer) 21 or 22, a PDA (Personal Digital Assistants) 23, a mobile communication terminal 24, a digital camera 25 and the like. An information storage device 30 can be placed in these information processing apparatuses 20, and the information processing apparatuses 20 can output information from the information storage device 30.

For example, the memory card 30 with a non-volatile memory (NVM), such as a flash memory, is placed into each of the information processing apparatuses 20. Each of the information processing apparatuses 20 stores data on the memory card 30 or read data stored on the memory card.

There is a case where the PCs (Personal Computers) 21 and 22, the PDA (Personal Digital Assistants) 23, the mobile communication terminal 24, and the digital camera 25 share one memory card 30. For example, image data captured by the digital camera 25 is stored on the memory card 30, and, subsequently, the memory card 30 is placed into the PC 21 to display the stored image data or to process the image. Alternatively, the PC 21 obtains content, such as music data, via a network, such as the Internet, or via a CD or a DVD, and stores the content on the memory card 30, and, subsequently, the memory card 30 having the content stored thereon is placed into the PDA 23, thereby allowing reading of the content at a remote site using the PDA 23.

Figure 2:
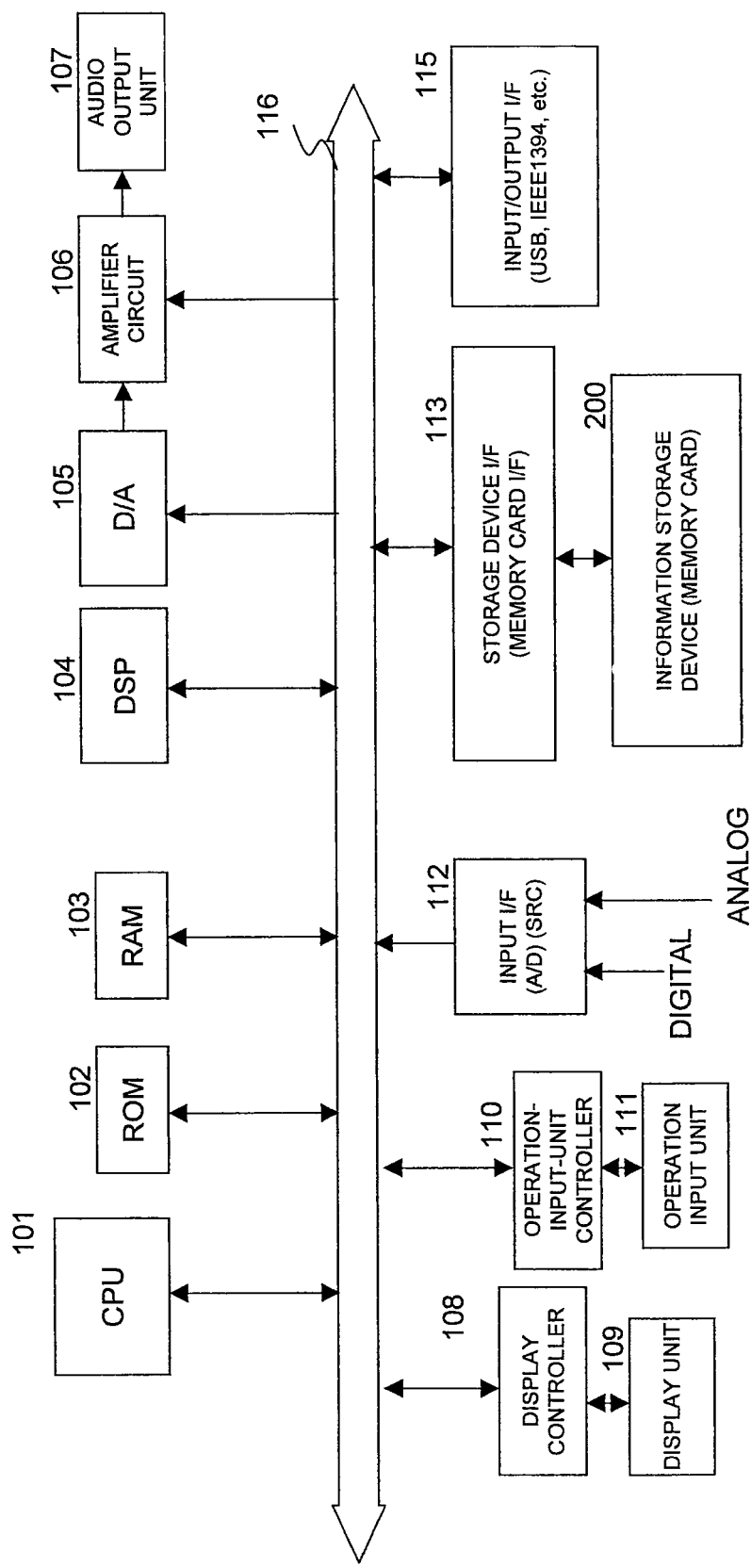
FIG. 2 is a diagram showing an example of the hardware configuration of a host device that uses the information storage device.

FIG. 2 shows an example of the configuration of an information processing apparatus into which an information storage device, such as a memory card, can be placed. A CPU (Central Processing Unit) 101 is a processor that executes various application programs and an OS (Operating System) accessed from memory (e.g. ROM 102) via bus 116. The CPU 101 controls hash-value computation in locking and unlocking the information storage device, which serves as access control on the information storage device described in detail below, various types of encryption including random-number generation, and command transmission and reception.

A ROM (Read Only Memory) 102 stores fixed data of the programs executed by the CPU 101 and calculation parameters. The ROM 102 stores a program for locking and unlocking the information storage device, which serves as access control on the information storage device described in detail later. A RAM (Random Access Memory) 103 stores information applied to the programs executed by the CPU 101 and parameters that change appropriately with the execution of the programs.

A DSP (Digital Signal Processor) 104 performs encryption, equalizer adjustment (gain adjustment in accordance with the frequency band of an audio signal), compression/decompression (encoding/decoding), and the like when reading content that has been input from an information storage device 200, such as a memory card, via a storage-device I/F 113.

Decrypted, decompressed content is converted by a digital/analog converter circuit 105 into an analog audio signal, and the analog audio signal is amplified by an amplifier circuit 106 and output from an audio output unit 107. Image data is output by a display unit 109, such as an LCD, via a display controller 108. As shown in FIG. 2, the CPU 101 is also operatively connected via bus 116 to an operation input-unit controller 110, which may receive an input via a standard operating input unit 111. A digital signal or an analog signal is input from an external source via an input I/F 112. When an analog signal is input, this analog signal is A/D converted. With A/D conversion, the input signal is converted into a digital signal. A digital signal input from an external source is converted by an SRC (Sampling Rate Converter) into a digital signal with a predetermined sampling frequency and a predetermined quantifying bit number, and the converted signal is input.

An input/output I/F 115 is an interface connecting to an external unit. For example, the input/output I/F 115 performs data transfer with a unit connected thereto by, for example, a USB or IEEE 1394 connection.

Figure 3:
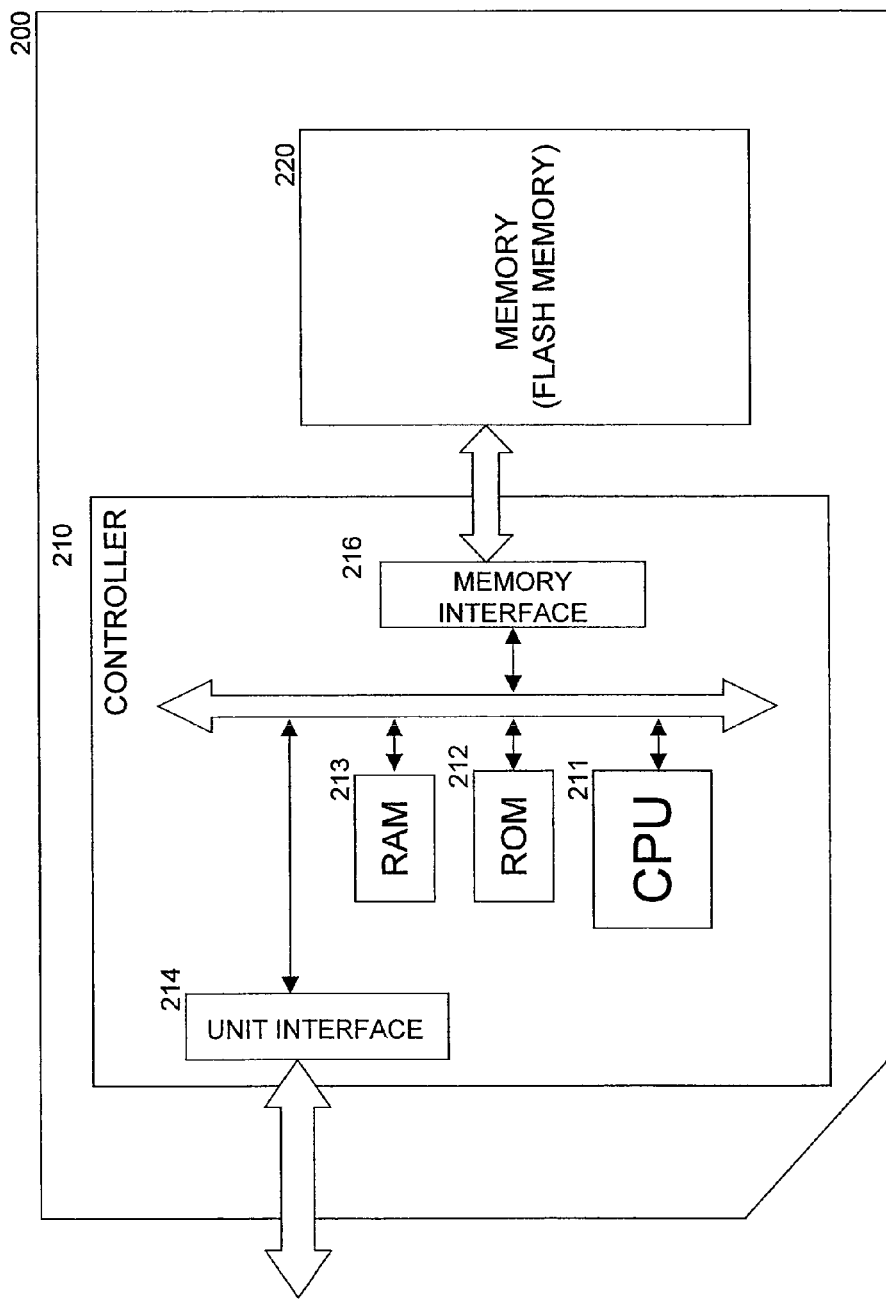
FIG. 3 is a diagram showing an example of the hardware configuration of the information storage device.

Referring to FIG. 3, an example of the configuration of the information storage device 200, such as a memory card with a non-volatile memory (NVM), such as a flash memory, will be described. The flash memory is one type of electrically-rewritable non-volatile memory referred to as an EEPROM (Electrically Erasable Programmable ROM). Since a known EEPROM has each bit consisting of two transistors, the area occupied per bit is large. There is a limit to increasing the number of components per chip. On the other hand, using an all-bits deletion scheme, the flash memory includes each bit consisting of one transistor.

The information storage device 200 with such a flash memory is placed in an information processing apparatus, such as a PC, a PDA, or a digital camera. Data input from the information processing apparatus is stored on a memory 220, and data stored on the memory 220 is output to the information processing apparatus.

The information storage device 200 further includes a controller 210. The controller 210 includes a CPU (Central Processing Unit) 211 serving as a processor that executes various programs, a ROM (Read Only Memory) 212 that stores fixed data of the programs executed by the CPU 211 and calculation parameters, and a RAM (Random Access Memory) 213 that stores information applied to the programs executed by the CPU 211 and parameters that change appropriately with the execution of the programs.

The RAM (Random Access Memory) 213 is also used as a region for storing status value data indicating the lock status of the information storage device, which changes due to locking and unlocking of the information storage device, which serves as access control on the information storage device described in detail later.

The controller 210 further includes a unit interface 214 serving as a data input/output interface with the information processing apparatus and a memory interface 216 serving as a data input/output interface with the memory 220.

The CPU 211 controls hash-value computation in a locking and unlocking process performed between the information storage device and the information processing apparatus, which serves as access control described in detail below, various types of encryption including random-number generation, and command transmission and reception.

[Process Based on Lock Master Key (LMK)]

Figure 4:
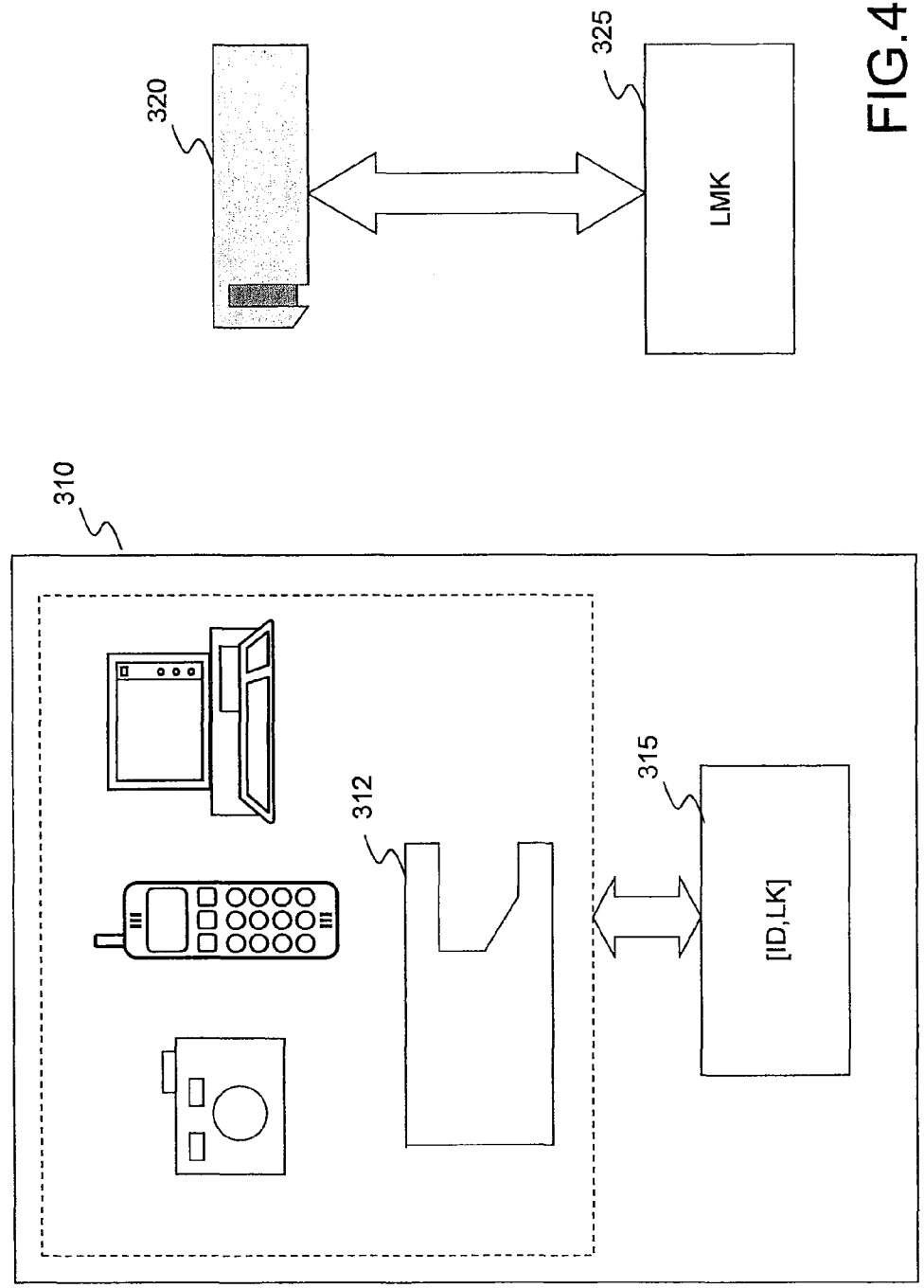
FIG. 4 is an illustration describing data stored in the information storage device of the present invention and data stored in the host device.

To serve as an example of a process for access control on an information storage device, locking and unlocking of the information storage device by applying a lock master key (LMK) will now be described. Referring to FIG. 4, an example of this process, that is, a process performed by applying the lock master key (LMK), will be schematically described.

Locking is to validate access control on a memory (memory 220 in FIG. 3), such as a flash memory, which is a region for storing data, such as content, of an information storage device 320, such as a memory card. Unlocking is to remove access control. Locking and unlocking are performed by a host device 310.

As has been described with reference to FIGS. 1 and 2, the host device 310 includes information processing apparatuses, such as a PC, a PDA, a digital camera, and a DSC (Digital Still Camera), each having an interface for performing data transfer with the information storage device 320, such as the memory card, and each writing data to the information storage device 320 or reading and using data from the information storage device 320. The host device 310 further includes a locking/unlocking unit 312 serving as a unit dedicated to locking/unlocking the information storage device 320, such as the memory card.

The locking/unlocking unit 312 includes a CPU serving as control means for executing locking and unlocking algorithms, a ROM and a RAM serving as data storage memories, and an interface in which the information storage device 320, such as the memory card, is placed and through which data transfer is performed. The locking/unlocking unit 312 is a unit dedicated to locking and unlocking the information storage device 320.

Hereinafter, a unit that locks and unlocks the information storage device 320, that is, a unit including a PC, a PDA, other information processing apparatuses, and the locking/unlocking unit 312 is referred to as a host device.

A memory 315, such as a ROM, in the host device stores an ID (e.g., 16-byte data) serving as an identifier unique to each host device and a lock key (LK) (e.g., 8-byte data) serving as key data applied to locking and unlocking the information storage device 320. A set [ID, LK] of the identifier (ID) unique to each host device and the lock key (LK), which are included in the host device, is referred to as a key set.

At the same time, a memory 325, such as a ROM, in a controller in the information storage device 320, such as the memory card, stores a lock master key (LMK). These pieces of information are written to each unit at the time of, for example, manufacturing of each unit and cannot be rewritten by a user.

The lock master key (LMK) stored in the information storage device 320 and the ID and the lock key (LK) stored in the host device have the following relationship:

$$LK = H(LMK, ID).$$

H(X,Y) represents the computation of a hash value for message Y by applying key X. In other words, the lock key (LK) associated with the ID is computed by computing a hash value for the ID by applying the lock master key (LMK).

A hash function is a one-way function and very difficult to reverse, that is, given an output, it is very difficult to compute an input. In the above equation, a one-way function is applied on the ID unique to each host device by applying the lock master key (LMK) as a key, thereby computing an output, which is the lock key (LK) associated with the ID unique to each host device. A hash algorithm such as MD5 or SHA can be applied.

(Locking)

Locking by applying the above-described lock master key (LMK), that is, validating access control on the information storage device, will now be described.

Figure 5:
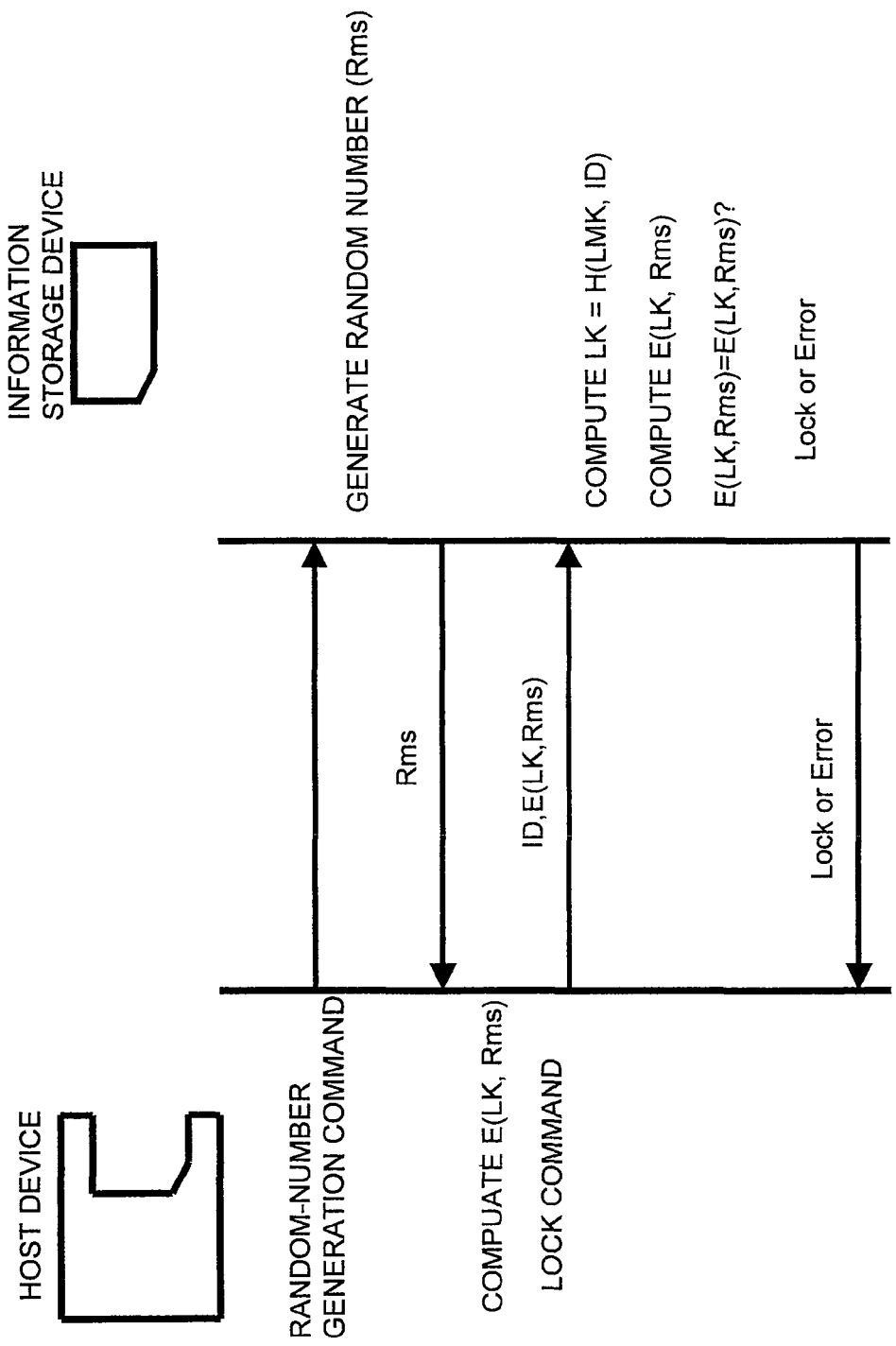
FIG. 5 is an illustration describing the sequence of a communication process performed between the information storage device and the host device in locking the information storage device.

FIG. 5 shows the sequence of a process performed between the host device and the information storage device in locking. The host device and the information storage device are interconnected so as to transfer data with each other. The host device outputs a random-number generation command to the information storage device. Upon reception of the random-number generation command, the information storage device generates a random number (Rms) of a predetermined length, for example, 16 bytes, and transmits the generated random number to the host device. The information storage device stores the generated random number (Rms) in a memory, such as a RAM, in a controller of the information storage device.

Upon reception of the random number (Rms) from the information storage device, the host device performs encryption E(LK, Rms) of the received random number (Rms) using the lock key (LK) stored in a memory of the host device as an encryption key, where E(X, Y) represents encryption of message [Y] by applying key [X]. Various algorithms can be applied as an encryption algorithm. For example, a DES encryption algorithm is applied.

The host device performs encryption E(LK, Rms) of the received random number (Rms) using the lock key (LK) as the encryption key and transmits the result data [E(LK, Rms)], the identifier (ID) unique to the host device, which is stored in advance by the host device in the memory in the host device, and a lock command to the information storage device.

Upon reception of the data including the ID and E(LK, Rms), the information storage device computes a hash value for the received ID by applying the lock master key (LMK) stored in the memory of the information storage device, thereby computing the lock key (LK) associated with the received ID. That is, the information storage device computes the lock key (LK) associated with the received ID:

$$LK=H(LMK, ID).$$

The received ID is stored in the memory of the information storage device. The received ID is used in unlocking, which will be described later.

The information storage device performs encryption E(LK, Rms) of the random number Rms, which is stored in the memory of the information storage device, by applying the lock key (LK) computed by the above-described hash-value computation and checks to see if this encrypted data is equal to the encrypted data E(LK, Rms) received from the host device. Various algorithms are applicable, as long as they are the same as the algorithm used by the host device.

When the data E(LK, Rms) received from the host device is equal to the encrypted data E(LK, Rms) computed by the information storage device, it is verified that the command is a locking request from the host device that has set data of the valid ID and LK. Locking is performed, and a locking completion notification is transmitted to the host device. The information storage device stores the key set [ID, LK] of the host device having performed locking in the memory 220 including the non-volatile memory (NVM), such as the flash memory.

When the data E(LK, Rms) received from the host device is unequal to the encrypted data E(LK, Rms) computed by the information storage device, it is determined that the host device is not a host device that has set data of the valid ID and LK, and that the command is a locking request from an unauthorized unit. Locking is not performed, and an error notification is transmitted to the host device.

Locking performed by the information storage device is permitting access to the memory (memory 220 in FIG. 3) including the flash memory, which is a region for storing data, such as content, provided that unlocking, which will be described later, is performed.

Figure 6:
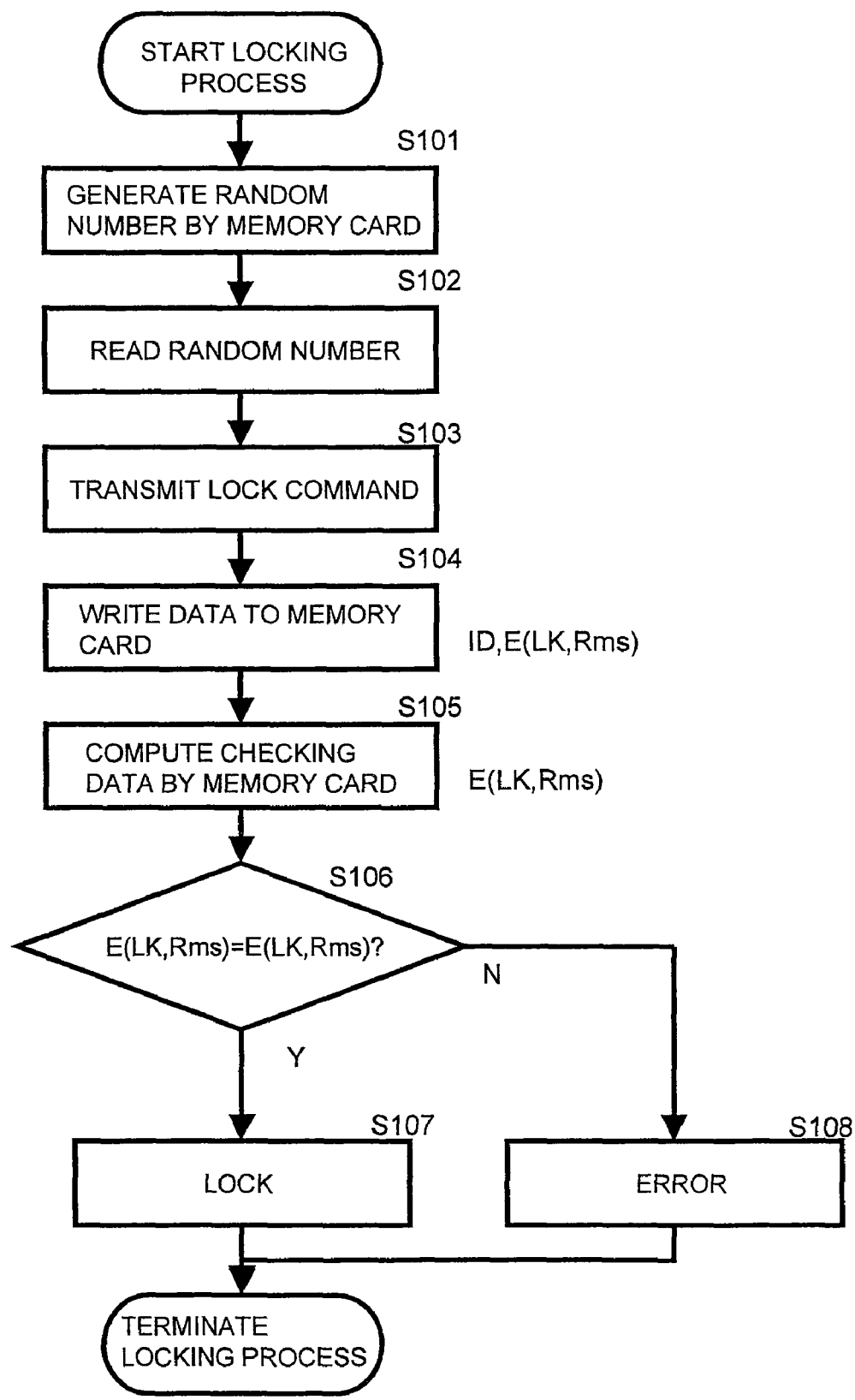
FIG. 6 is a flowchart describing a process of locking the information storage device.

Referring to the flowchart of FIG. 6, the steps of a locking process will now be described. In step S101, the memory card serving as the information storage device generates a random number (Rms) in response to reception of a random-number generation request command from the host device. In step S102, the generated random number is read by the host device. In step S103, the host device transmits, in addition to a lock command, the ID of the host device and encrypted data E(LK, Rms) generated by encrypting the random number (Rms) using the lock key (LK) of the host device to the memory card serving as the information storage device.

In step S104, the memory card writes the received ID and the encrypted data E(LK, Rms) into the memory in the information storage device. In step S105, the memory card computes a hash value for the received ID by applying the lock master key (LMK) stored in the memory of the memory card, that is, computes the lock key (LK) associated with the received ID:

$$H(LMK, ID)=LK.$$

On the basis of the computed lock key (LK), the memory card encrypts the random number (Rms), which is previously generated in step S101, and computes encrypted data E(LK, Rms) serving as checking data.

In step S106, the memory card performs comparing and checking [E(LK, Rms)=E(LK, Rms)?] of the encrypted data E(LK, Rms) computed in step S105 and the encrypted data E(LK, Rms) received from the host device in addition to the lock command in step S103 and stored in the memory in step S104 to see if the two pieces of data are equal.

When these two values are equal as determined by the comparing and checking, the host device is verified as a valid unit that has set data of the valid, correct ID and lock key (LK). In step S107, locking is performed in response to the lock command, thereby permitting access to the memory provided that unlocking, which will be described later, succeeds. The information storage device stores the key set [ID, LK] of the host device having performed locking in the memory 220 including the non-volatile memory (NVM), such as the flash memory.

When the two values are unequal as determined in step S106 by the comparing and checking, in step S108, the host device having transmitted the lock command is determined as an unauthorized unit that has no set data of the correct ID and lock key (LK). Locking is not performed, and an error notification is transmitted to the host device.

(Unlocking)

Unlocking or releasing the lock set by locking by applying the lock master key (LMK) described above, that is, removing access control on the information storage device, will now be described.

Figure 7:
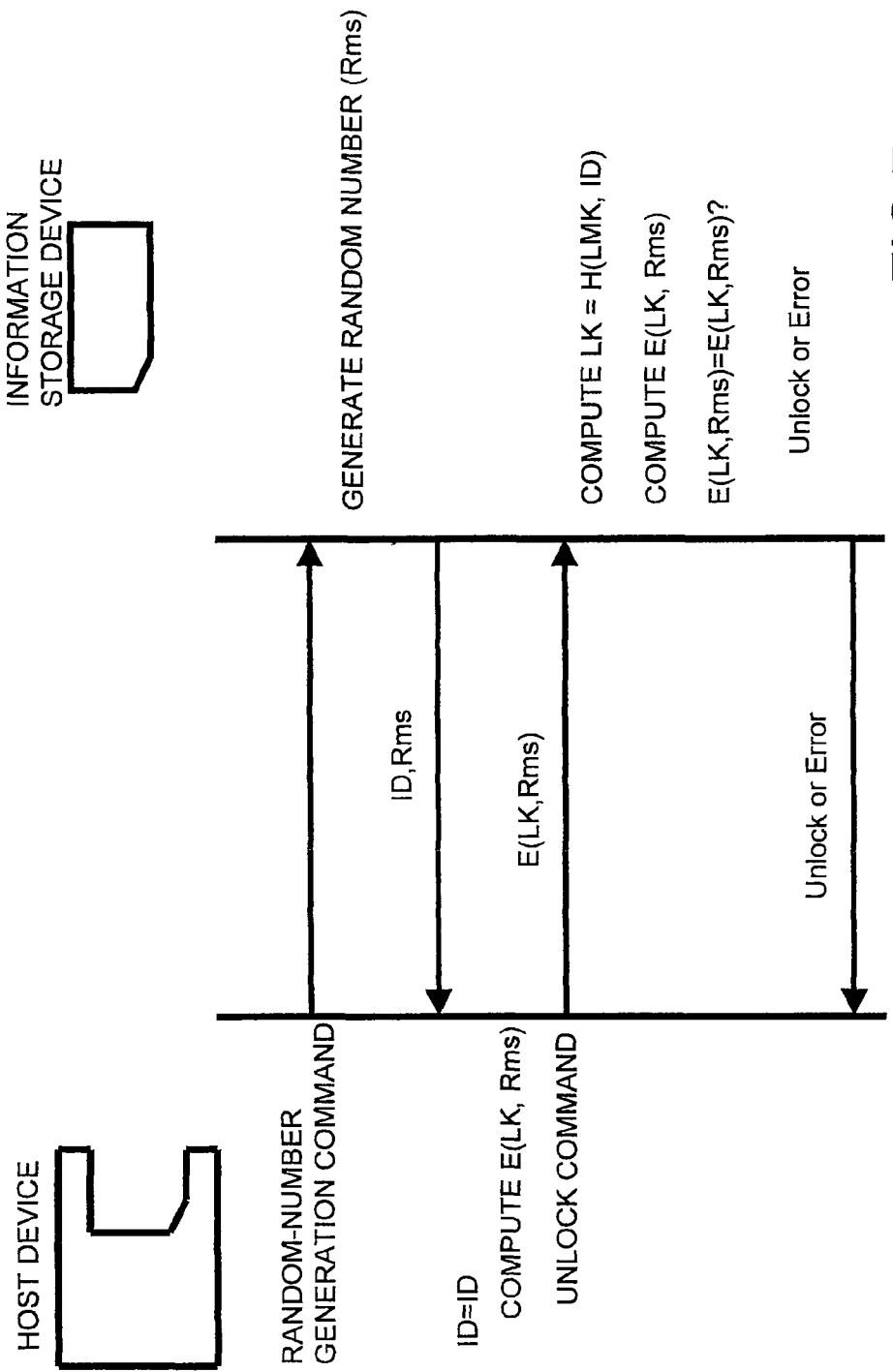
FIG. 7 is an illustration describing the sequence of a communication process performed between the information storage device and the host device in unlocking the information storage device.

FIG. 7 shows the sequence of a process performed between the host device and the information storage device in unlocking. The host device and the information storage device are interconnected so as to transfer data with each other. The host device outputs a random-number generation command to the information storage device. Upon reception of the random-number generation command, the information storage device generates a random number (Rms) of a predetermined length, for example, 16 bytes, and transmits the generated random number (Rms) and the ID of the host device, which has been stored in the memory in the previous locking process, that is, the ID of the host device having performed locking, to the host device. The information storage device stores the generated random number (Rms) in the memory, such as the RAM, in the controller of the information storage device.

Upon reception of the ID and the random number (Rms) from the information storage device, the host device checks the received ID against the ID of the host device to see if the two IDs are equal. When the two IDs are unequal, the lock is set by another host device and cannot be released.

When the received ID is equal to the ID of the host device, the lock is set by this host device and can be released or unlocked. In this case, the host device performs encryption E(LK, Rms) of the received random number (Rms) using the lock key (LK) stored in the memory in the host device as an encryption key and transmits the resultant data, in addition to an unlock command, to the information storage device.

Upon reception of the encrypted data E(LK, Rms), the information storage device reads the host device ID stored in the memory of the information storage device, that is, the ID of the host device having performed locking, and computes a hash value for the read ID by applying the lock master key (LMK), thereby computing the lock key (LK) associated with the ID of the host device having performed locking. That is, the information storage device computes the lock key (LK) associated with the ID of the host device having performed locking:

$$LK=H(LMK, ID).$$

The information storage device performs encryption E(LK, Rms) of the random number Rms stored in the memory of the information storage device by applying the lock key (LK) computed by the above-described hash-value computation and checks this encrypted data against the encrypted data E(LK, Rms) received from the host device to see if the two pieces of data are equal.

When the data E(LK, Rms) received from the host device is equal to the encrypted data E(LK, Rms) computed by the information storage device, it is verified that the unlock command is an unlock request from the host device that has set data of the valid ID and LK. Unlocking is performed, and an unlocking completion notification is transmitted to the host device. When the two pieces of data are unequal, it is determined that the host device is not a host device that has set data of the valid ID and LK and that the unlock command is an unlock request from an unauthorized unit. Unlocking is not performed, and an error notification is transmitted to the host device.

Unlocking performed by the information storage device means releasing the lock, that is, permitting access to the memory (memory 220 in FIG. 3) including the flash memory or the like, which is a region for storing data, such as content.

Figure 8:
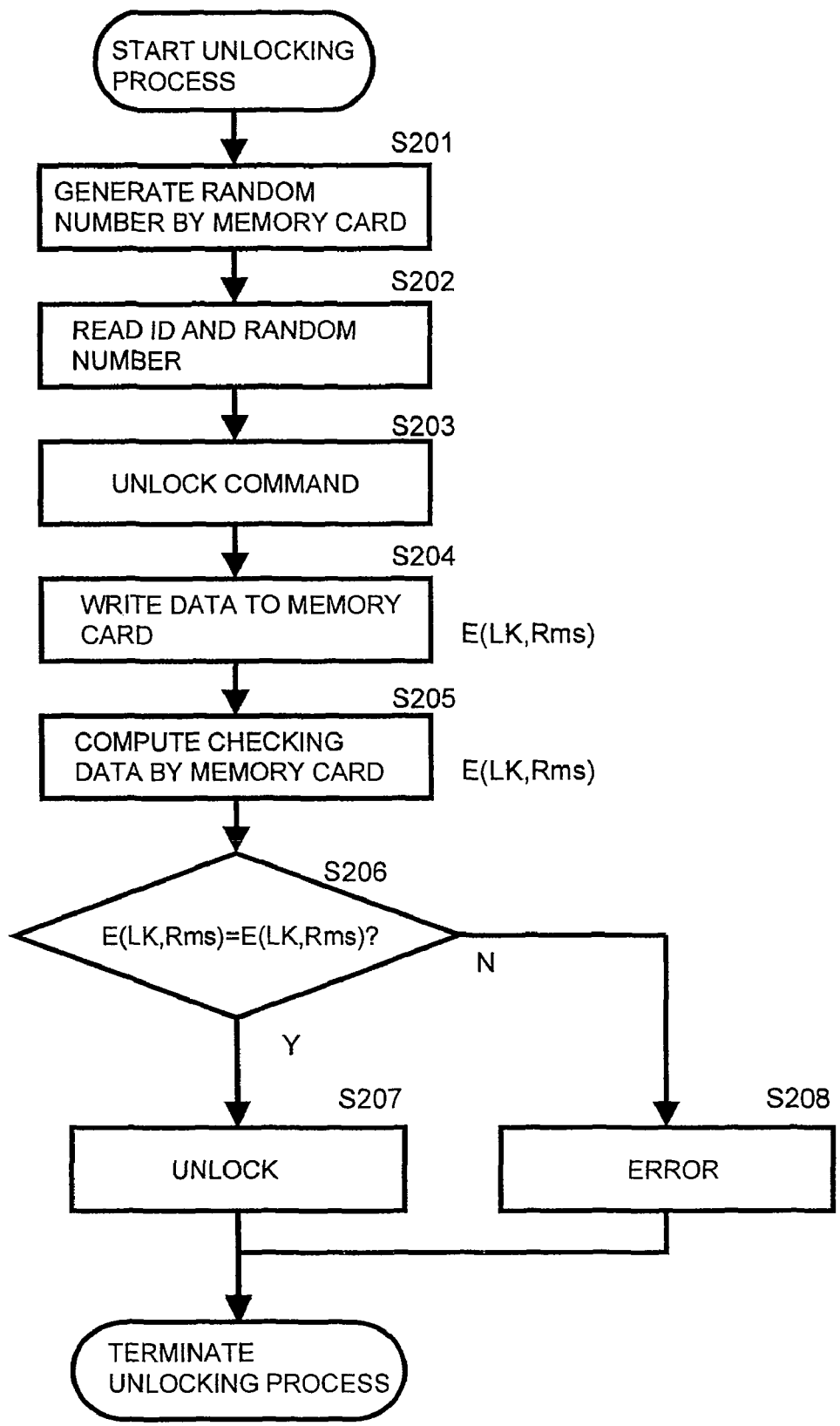
FIG. 8 is a flowchart describing a process of unlocking the information storage device.

Referring to the flowchart of FIG. 8, the steps of an unlocking process will now be described. In step S201, the memory card serving as the information storage device generates a random number (Rms) in response to reception of a random-number generation request command from the host device. In step S202, the host device reads the generated random number, in addition to the ID of the host device having previously performed locking.

When the ID read from the memory card is equal to the host ID of the host device, the host device determines that the lock can be unlocked. In step S203, the host device transmits, in addition to an unlock command, encrypted data E(LK, Rms) generated by encrypting the received random number (Rms) using the lock key (LK) of the host device to the memory card serving as the information storage device.

In step S204, the memory card writes the received encrypted data E(LK, Rms) into the memory in the information storage device. In step S205, the memory card reads the ID of the host device having performed locking, which is stored in the memory in the previous locking process, and computes a hash value for the read ID by applying the lock master key (LMK) stored in the memory of the memory card, thereby computing the lock key (LK) associated with the ID:

$$H(LMK, ID)=LK.$$

On the basis of the computed lock key (LK), the memory card encrypts the random number (Rms), which is previously generated in step S201, and generates encrypted data E(LK, Rms) serving as checking data.

In step S206, the memory card performs comparing and checking [E(LK, Rms)=E(LK, Rms)?] of the encrypted data E(LK, Rms) computed in step S205 and the encrypted data E(LK, Rms) received from the host device in addition to the unlock command in step S203 and stored in the memory in step S204 to see if the two pieces of data are equal.

When these two values are equal as determined by the comparing and checking, the host device is verified as a valid unit that has set data of the valid, correct ID and lock key (LK). In step S207, unlocking is performed in response to the unlock command, thereby permitting access to the memory. In contrast, when the two values are unequal as determined in step S206 by the comparing and checking, in step S208, the host device having transmitted the unlock command is determined as an unauthorized unit that has no set data of the correct ID and the lock key (LK), which are applied to locking. Unlocking is not performed, that is, the lock is not released, and an error notification is transmitted to the host device.

As described above, according to this example of the process, only the host device that has valid set data of the host device ID and the lock key (LK) associated with the host device ID is permitted to lock the information storage device. Unlocking or releasing the lock can only be performed by the host device having performed locking. In the above-described locking and unlocking process, one-sided authentication is performed where only the information storage device performs authentication of the host device. The processing load on the host device is lessened, and the process is performed efficiently.

In the above-described locking and unlocking process, the random number generated in each process is applied at the information storage device side. Data recorded in the past process cannot be applied, thereby efficiently preventing an unauthorized process based on a trace of the past process.

[Locking by Unit Group]

The above-described locking and unlocking process is performed on the information storage device by each host device. The lock can be unlocked only by the host device having locked the information storage device. In circumstances where plural host devices use one information storage device (memory card), a host device (unit A) stores data on an information storage device (memory card) and locks this memory card, and another host device (unit B) may want to use this information storage device (memory card).

Figure 9:
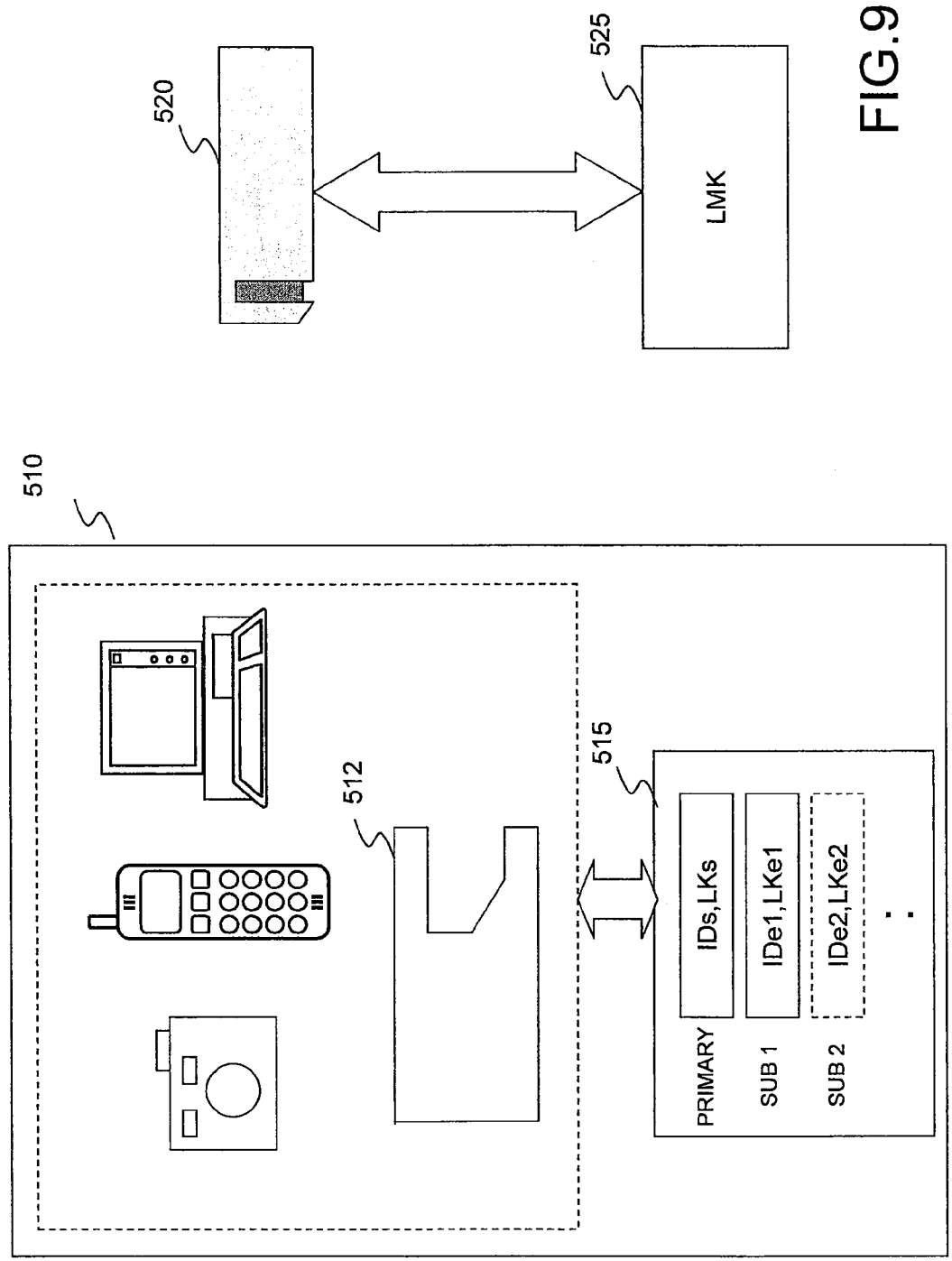
FIG. 9 is an illustration describing data stored in the information storage device of the present invention and data stored in the host device.

In such a case, the lock cannot be released by the host device (unit B) unless the lock is released by the host device (unit A). Hereafter, an example of a process for solving this problem is described. That is, host devices are enabled to individually lock and unlock the information storage device. Referring to FIG. 9, the example of the process will now be schematically described.

Locking is to validate access control on a memory (memory 220 in FIG. 3), such as a flash memory, which is a region for storing data, such as content, of an information storage device 520, such as a memory card. Unlocking is to remove access control. These are the same as those in the previous example of the process. Locking and unlocking are performed by a host device 510.

As has been described with reference to FIGS. 1 and 2, the host device 510 includes information processing apparatuses, such as a PC, a PDA, a digital camera, and a DSC (Digital Still Camera), each having an interface for performing data transfer with the information storage device 520, such as the memory card, and each writing data to the information storage device 520 or reading and using data from the information storage device 520. The host device 510 further includes a locking/unlocking unit 512 serving as a unit dedicated to locking/unlocking the information storage device 520, such as the memory card.

A memory 515, such as a ROM, in the host device stores IDs (e.g., 16-byte data) serving as an identifier unique to each host device and a lock key (LKs) (e.g., 8-byte data) serving as key data applied to locking and unlocking. As described above, the IDs and the LKs are a set of data corresponding to the ID and LK in the previous example of the process. As in the previous process, the IDs and the LKs can be applied to locking and unlocking.

The IDs is a primary ID, and the LKs is a primary lock key. At the time of manufacturing of each host device, the IDs and the LKs are written to a memory, such as a ROM, in each host device and cannot be rewritten by a user. As in the previous example of the process in which LMK is applied, the primary ID (IDs) and the primary lock key (LKs) are applicable to locking and unlocking in which the host devices have a one-to-one relationship with information storage devices. A key set [IDs, LKs] consisting of the primary ID unique to each host device and the primary lock key is referred to as a primary key set.

Locking by applying this primary key set [IDs, LKs] is referred to as standard locking. By outputting a standard lock command from the information processing apparatus serving as the host device to the information storage device, standard locking is performed. By outputting an unlock command, unlocking is performed.

The memory 515, such as the ROM, in the host device can store at least one sub key set [IDen, LKen] (n=1, 2, ... ) serving as set data of a sub ID and a sub lock key, which serve as a key set that can be copied and supplied to another host device.

This sub key set [IDen, LKen] is a key that can be commonly stored in a plurality of host devices. With a process described below, the sub key set [IDen, LKen] stored in another host device can be copied and stored in yet another host device via the information storage device.

Locking the information storage device (memory card) by applying the sub key set [IDen, LKen], which can be copied and output to another host device via the information storage device (memory card), is referred to as export locking.

Locking by applying the sub key set [IDen, LKen] is referred to as export locking. By outputting an export lock command from the information processing apparatus serving as the host device to the information storage device, export locking is performed. By outputting an unlock command, unlocking is performed.

The sub key set [IDen, LKen] obtained by the host device from the export-locked information storage device (memory card) can be written to the memory in the host device. This copying and writing of the sub key set is referred to as imprinting. By imprinting, a group consisting of a plurality of host devices that have the same sub key set [IDen, LKen] is formed.

Accordingly, the sub key set [IDen, LKen] is a key set applicable to locking in which the sub key set [IDen, LKen] can be output, namely, export locking. The sub key set [IDen, LKen] is represented by adding [e] to ID and LK, where n of [en] indicates the sub key set number corresponding to the number of groups defined.

Each host device can store a plurality of different sub key sets. For example, sub key set 1 [IDe1, LKe1] is set as a common sub key set (sub 1) shared among a group of three host devices consisting of PC (Personal Computer)-a, PC-b, and PDA (Personal Digital Assistants)-a; and sub key set 2 [IDe2, LKe2] is set as a sub key set (sub 2) shared among a group of PC-a, PDA-a, and PDA-b. In such a case, each of the host devices stores the corresponding primary key set [IDs, LKs] consisting of the primary ID (IDs) and the primary lock key (LKs) in the memory. In addition, the host devices store the following sub key sets, each consisting of the sub ID and the sub lock key:

PC-a stores [IDe1, Lke1] and [IDe2, LKe2];
PC-b stores [IDe1, LKe1];
PDA-a stores [IDe1, LKe1] and [IDe2, LKe2]; and
PDA-b stores [IDe2, LKe2].

By writing the sub key set [IDen, LKen] consisting of set data of the sub ID and the sub lock key into the memory 515 of each host device, each host device becomes a member of a host device group-n including at least one host device. Each member of the group n applies the commonly-stored sub ID (IDn) and the common sub lock key (LKn) to lock and unlock one information storage device (memory card).

In contrast, a memory 525, such as a ROM, in a controller in the information storage device 520, such as the memory card, stores the lock master key (LMK). The lock master key (LMK) stored in the information storage device 520 and the ID (including IDs and IDen) and the lock key (LK (including LKs and LKen)) stored in the host device have the following relationship:

$$LK=H(HMK, ID).$$

The relationship of the lock master key (LMK) with the ID and the LK is exactly the same as that in the previously-described process in which LMK is applied. By computing a hash value for the primary ID (IDs) by applying the lock master key LMK, the primary lock key (LKs) is computed. By computing a hash value for the sub ID (IDen) by applying the lock master key LMK, the sub lock key (LKen) is computed.

Figure 10:
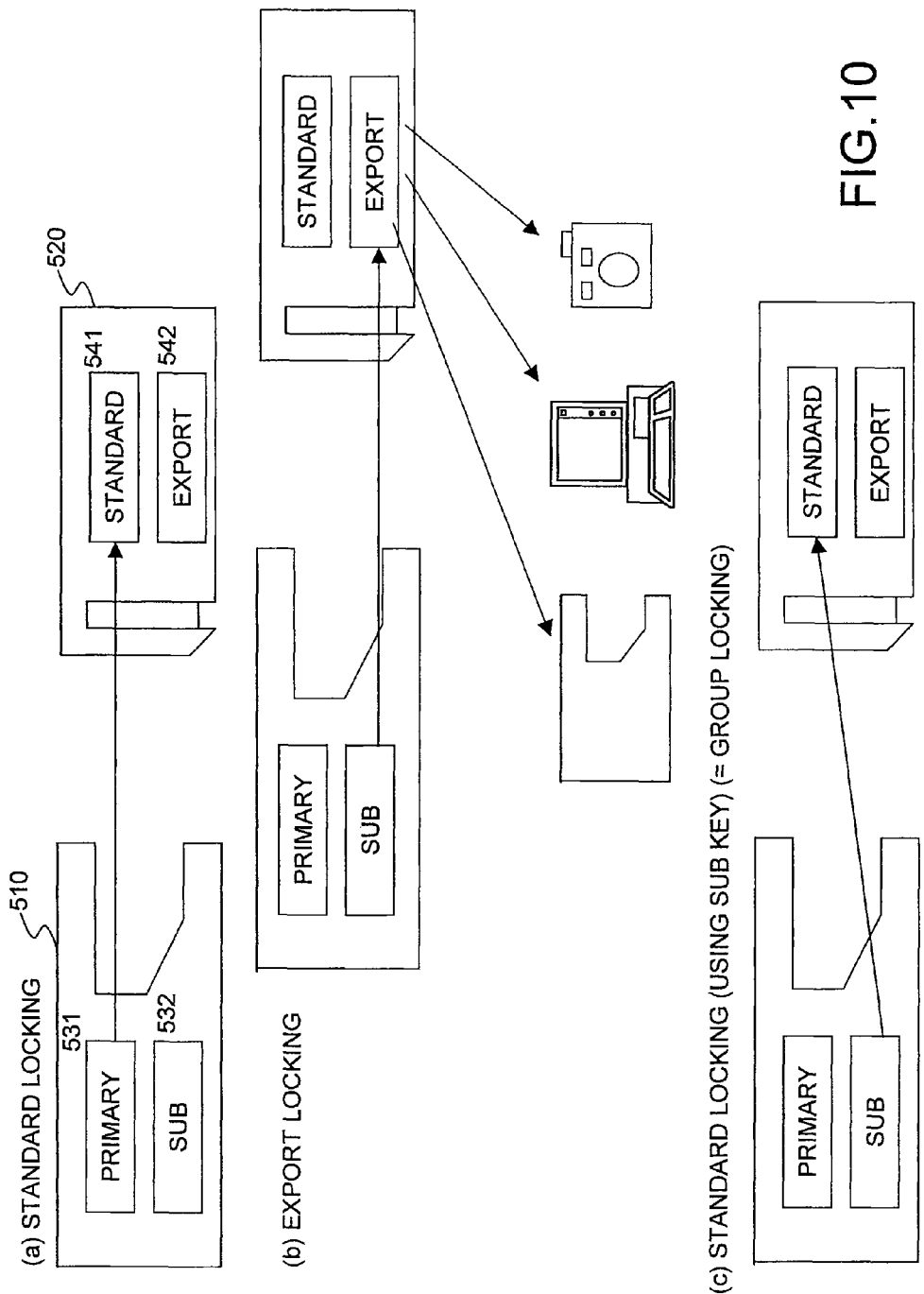
FIG. 10 is an illustration describing modes of locking the information storage device of the present invention.

Referring to FIG. 10, modes of locking using the primary key set [IDs, LKs] and the sub key set [IDen, LKen] will now be described. The locking modes consist of three modes shown in portions (a) to (c) of FIG. 10.

Portion (a) shows standard locking in which a primary key set [IDs, LKs] 531 consisting of a primary ID (IDs) unique to each host device 510 and a primary lock key (LKs) is applied.

Standard locking by applying the primary key set [IDs, LKs] 531 is performed by outputting a standard lock command from the host device 510 to the information storage device 520. By outputting an unlock command, unlocking is performed.

When the information storage device 520 is standard-locked, the primary key set [IDs, LKs] is stored in a standard-lock-key-set storage region 541 of a storage (flash memory) of the information storage device (memory card) 520. The primary key set [IDs, LKs] applied to standard locking is not output from the locked information storage device (memory card) 520. The information storage device 520 can be unlocked only by a host device that has the same primary key set [IDs, LKs], that is, a host device that has performed standard locking.

As in the above-described process in which LMK is applied, the primary key set [IDs, LKs] consisting of the primary ID (IDs) and the primary lock key (LKs) can be applied to locking and unlocking in which the host devices have a one-to-one relationship with information storage devices. Locking and unlocking, which are similar to those described with reference to FIGS. 5 to 8, can be performed.

Portion (b) shows export locking in which a sub key set [IDen, LKen] 532 consisting of a sub ID (IDen) and a sub lock key (LKen) that can be shared among a plurality of host devices is applied.

Export locking by applying the sub key set [IDen, LKen] 532 is performed by outputting an export lock command from the host device 510 to the information storage device 520. Unlocking is performed by outputting an unlock command.

When the information storage device 520 is export-locked, the sub key set [IDen, LKen] is stored in an export-lock-key-set storage region 542 of the storage (flash memory) of the locked information storage device (memory card) 520. When this type of locking is performed, the sub key set [IDen, LKen] applied to export locking can be obtained by another host device from the locked information storage device (memory card) 520 by imprinting, which will be described in detail later.

When the information storage device 520 is export-locked, the information storage device 520 can be unlocked by the host device that has locked the information storage device 520 and by a host device that has performed imprinting and obtained the sub key set [IDen, LKen] applied to export locking.

Portion (c) shows standard locking in which the sub key set [IDen, LKen] 532 consisting of the sub ID (IDen) and the sub lock key (LKen), which can be shared among plural host devices 510, is applied. This is referred to as group locking.

Standard locking by applying the sub key set [IDen, LKen] 532, that is, group locking, is performed by outputting a standard lock command from the host device 510 to the information storage device 520. Unlocking is performed by outputting an unlock command. The key set applied to group locking is the sub key set [IDen, LKen] 532.

Basically, group locking is similar to standard locking. The key set applied to group locking is the sub key set [IDen, LKen] 532. When the information storage device 520 is group-locked, the sub key set [IDen, LKen] is stored in the standard-lock-key-set storage region 541 of the storage (flash memory) of the information storage device 520. When this type of locking is performed, the sub key set [IDen, LKen] applied to group locking is stored in the standard-lock-key-set storage region 541. Therefore, the sub key set [IDen, LKen] is not output from the locked information storage device (memory card) 520.

The group-locked information storage device 520 can be unlocked only by host devices that have the same sub key set [IDen, LKen]. In this case, these host devices include not only the host device that has group-locked the information storage device 520, but also a host device that has obtained, in advance, the same sub key set [IDen, LKen].

For example, export locking is performed in advance by applying the same sub key set [IDen, LKen]. At the time the export locking is performed, a host device performs imprinting, obtains the same sub key set [IDen, LKen], and stores the sub key set [IDen, LKen] in the memory. This host device can perform unlocking.

The sequence of locking and unlocking in standard locking by applying the sub key set [IDen, LKen], that is, group locking, is similar to that performed by applying LMK (see FIGS. 5 to 8). Only difference is that, with imprinting, plural host devices can perform locking and unlocking.

Hereinafter, locking by applying the sub key set [IDen, LKen] consisting of the sub ID (IDen) and the sub lock key (LKen) which can be shared among plural host devices, copying and storing (imprinting) of the sub key set [IDen, LKen] into the host device via the information storage device (memory card), and unlocking or releasing the export-locked information storage device (memory card) will now be described.

(Locking Based on Sub Key Set)

Locking of the information storage device (memory card) by applying the sub key set [IDen, LKen] consisting of the sub ID (IDen) and the sub lock key (LKen) will now be described in detail.

As described above, by locking the information storage device (memory card) by applying the sub key set [IDen, LKen], the information storage device (memory card) is export-locked in which the sub key set applied to locking can be copied and output to another host device via the information storage device (memory card).

Figure 11:
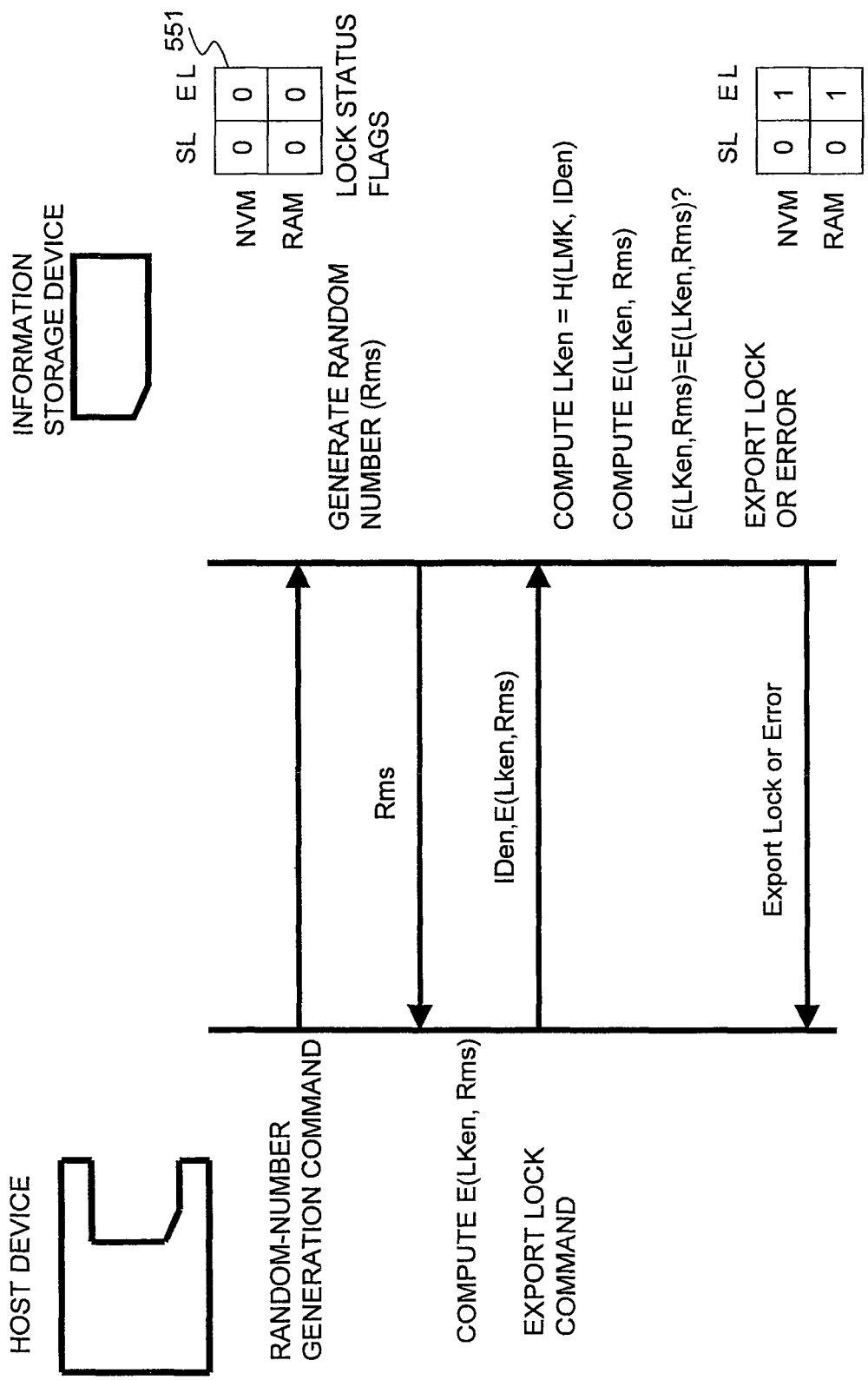
FIG. 11 is an illustration describing the sequence of a communication process performed between the information storage device and the host device in locking the information storage device by applying a sub key set.

FIG. 11 shows the sequence of a process performed between the host device and the information storage device in locking based on the sub key set. The host device and the information storage device are interconnected so as to transfer data with each other.

The information storage device includes lock status flags 551 shown in FIG. 11. Each of the lock status flags 551 maintains a value that indicates the lock status of the information storage device. NVM in the upper portion includes flags stored in an NVM (Non-Volatile memory) region of the memory 220, such as the flash memory shown in FIG. 3. The lower portion includes flags stored in the RAM 213 in the controller 210. By turning off the information storage device, the flags in the RAM are deleted, whereas flag data in the NVM is maintained. Upon rewriting of the flags in the RAM, flag data in the NVM is copied. When power is turned off and then on, flag information in the NVM is copied to the RAM. SL denotes standard locking; EL denotes export locking; 1 denotes a locked status; and 0 denotes an unlocked status.

Standard locking is a locking mode in which a key set [ID, LK] applied to locking cannot be output. Export locking is a locking mode in which a key set [ID, LK] applied to locking can be output. When SL=1, the information storage device is standard-locked. When EL=1, the information storage device is export-locked.

The information storage device (memory card) has data storage regions for storing a key set applied to standard locking and a key set applied to export locking, respectively, which are in the memory (flash memory (NVM)).

In the initial status, as shown in the drawing, SL=0 and EL=0 in which no standard locking (SL) nor export locking (EL) is performed. That is, all host devices can access the memory of the information storage device.

In the initial status, one host device outputs a random-number generation command to the information storage device. Upon reception of the random-number generation command, the information storage device generates a random number (Rms) of a predetermined length, for example, 16 bytes, and transmits the generated random number to the host device. The information storage device stores the generated random number (Rms) in the memory, such as the RAM, in the controller.

Upon reception of the random number (Rms) from the information storage device, the host device performs encryption E(LKen, Rms) of the received random number (Rms) using the sub lock key (LKen), which has been stored in advance in the memory in the host device, as an encryption key. Various algorithms can be applied as an encryption algorithm. For example, a DES encryption algorithm is applied.

The host device performs encryption E(LKen, Rms) of the received random number (Rms) using the sub lock key (LKen) as the encryption key and transmits the result data [E(LKen, Rms)], the sub ID (IDen) serving as set data associated with the sub lock key (LKen), which is stored by the host device in advance in the memory in the host device, and a lock command to the information storage device.

Upon reception of the data including the IDen and E(LKen, Rms), the information storage device computes a hash value for the received sub ID (IDen) by applying the lock master key (LMK) stored in the memory of the information storage device, thereby computing the sub lock key (LKen) associated with the received sub ID (IDen). That is, the information storage device computes the sub lock key (LKen) associated with the received sub ID (IDen):

$$LKen=H(LMK, IDen).$$

The received sub ID (IDen) is stored in the memory of the information storage device. The received sub ID (IDen) is used in unlocking, which will be described later.

The information storage device performs encryption E(LKen, Rms) of the random number (Rms), which is stored in the memory of the information storage device, by applying the sub lock key (LKen) computed by the above-described hash-value computation and checks to see if this encrypted data is equal to the encrypted data E(LKen, Rms) received from the host device. Various algorithms are applicable, as long as they are the same as the algorithm used by the host device.

When the data E(LKen, Rms) received from the host device is equal to the encrypted data E(LKen, Rms) computed by the information storage device, it is verified that the command is a locking request from the host device that has set data of the valid sub ID (IDen) and the sub lock key (LKen). Export locking is performed, and a locking completion notification is transmitted to the host device. When the data E(LKen, Rms) received from the host device is unequal to the encrypted data E(LKen, Rms) computed by the information storage device, it is determined that the host device is not a host device that has set data of the valid sub ID (IDen) and the sub lock key (LKen), and that the command is a locking request from an unauthorized unit. Export locking is not performed, and an error notification is transmitted to the host device.

Export locking performed by the information storage device is to permit access to the memory (memory 220 in FIG. 3) including the flash memory, which is a region for storing data, such as content, provided that unlocking by applying the sub ID and the sub lock key, which will be described later, is performed. An export key set [IDen, LKen] applied to export locking is stored in an export-lock-key-set storage region in the memory (flash memory (NVM)) of the information storage device (memory card). The lock status flags are rewritten.

When export locking is performed, as shown in the drawing, the lock status flags are changed to EL=1 indicating that export locking is valid and stored in the NVM and the RAM. These flags are changed by setting EL=1 to the RAM 213 (see FIG. 3) in the controller in the information storage device and, subsequently, copying EL=1 to the NVM (memory 220 including the flash memory or the like). When power is turned off in this status, flag information in the RAM is deleted, whereas flag information in the NVM is maintained. Subsequently, when power is turned on, the flag information in the NVM (EL=1) is copied to the RAM, and the controller 210 (see FIG. 3) performs a process based on the flag information (EL=1) in the RAM.

The flag information EL=1 indicates that the information storage device is export-locked. The sub key stored in the export-lock-key-set storage region of the NVM (memory 220 including the flash memory or the like) of the information storage device (memory card) can be output to another host device by imprinting, which will be described later.

Figure 12:
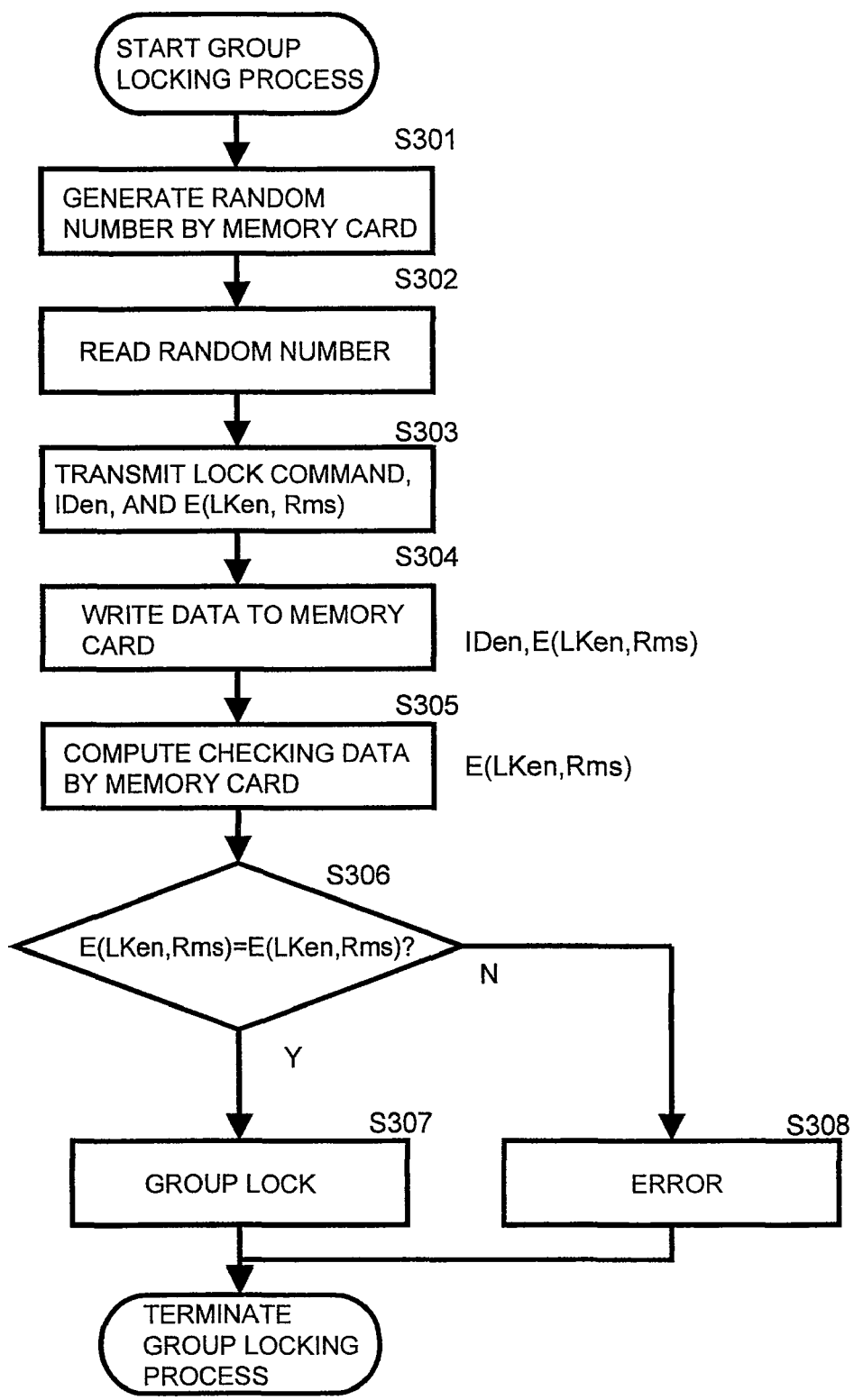
FIG. 12 is a flowchart describing a process of locking the information storage device by applying the sub key set.

With reference to the flowchart of FIG. 12, the steps of an export locking process will now be described. In step S301, the memory card serving as the information storage device generates a random number (Rms) in response to reception of a random-number generation request command from the host device. In step S302, the host device reads the generated random number. In step S303, the host device obtains, in addition to a lock command, the sub ID (IDen), which has already been stored in the storage of the host device, encrypts the received random number (Rms) using the sub lock key (LKen), which has already been stored in the storage of the host device, to generate data E(LKen, Rms), and transmits these associated pieces of data including IDen and E(LKen, Rms) to the memory card serving as the information storage device.

In step S304, the memory card writes the received sub ID (IDen) and the encrypted data E(LKen, Rms) into the memory in the information storage device. In step S305, the memory card computes a hash value for the received sub ID (IDen) by applying the lock master key (LMK) stored in the memory of the memory card, thereby computing the sub lock key (LKen) associated with the received sub ID (IDen). That is, the information storage device computes the sub lock key (LKen) associated with the received sub ID (IDen):

$$H(LMK, IDen)=LKen.$$

On the basis of the computed sub lock key (LKen), the memory card encrypts the random number (Rms), which is previously generated in step S301, and generates encrypted data E(LKen, Rms) serving as checking data.

In step S306, the memory card performs comparing and checking [E(LKen, Rms)=E(LKen, Rms)?] of the encrypted data E(LKen, Rms) computed in step S305 and the encrypted data E(LKen, Rms) received from the host device in addition to the lock command in step S303 and stored in the memory in step S304 to see if the two pieces of data are equal.

When these two values are equal as determined by the comparing and checking, the host device is verified as a valid unit that has the sub key set [IDen, LKen] serving as set data of the valid, correct sub ID (IDen) and the sub lock key (LKen). In step S307, locking is performed in response to the lock command, thereby permitting access to the memory provided that unlocking or releasing the lock by applying the sub key set [IDen, LKen], which will be described later, succeeds. The above-described lock status flags are set to EL=1.

When E(LKen, Rms)=E(LKen, Rms) does not hold true, which is determined in step S306 by the comparing and checking, in step S308, the host device having transmitted the lock command is determined as an unauthorized unit that has no set data of the correct sub ID (IDen) and the sub lock key (LKen). Locking is not performed, and an error notification is transmitted to the host device.

The export-locked information storage device, which has been export-locked by the above process, can be unlocked by a process similar to unlocking described in the previous [process based on lock master key (LMK)] by a host device that has the same sub key set [IDen, LKen] serving as set data of the sub ID (IDen) and the sub lock key (LKen) used in locking the information storage device. That is, the information storage device can be unlocked by substituting the ID and the lock key to be applied with the sub ID (IDen) and the sub lock key (LKen).

Another host device that does not have the same key set as the sub key set [IDen, LKen] used in locking the information storage device cannot unlock the information storage device, that is, cannot access the information storage device, unless this host device obtains the sub key set [IDen, LKen] applied to locking the information storage device.

The host device having the primary key set [IDs, LKs] serving as set data of the valid primary ID (IDs) and the primary lock key (LKs) can obtain the sub key set [IDen, LKen], which is stored in the export-locked information storage device, from the information storage device. This host device can unlock the information storage device by applying the obtained sub key set [IDen, LKen]. Obtaining of the sub key set [IDen, LKen] via the information storage device is referred to as imprinting.

The information storage device is export-locked when the information storage device is locked on the basis of the sub key set [IDen, LKen] in which the sub key set [IDen, LKen] can be output to another host device.

By obtaining (imprinting) the sub key set [IDen, LKen] applied to export locking from the export-locked information storage device, the host device becomes a member of a group consisting of a plurality of host devices that have the same sub key set [IDen, LKen]. Subsequently, this host device can apply the obtained sub key set [IDen, LKen] to unlock the information storage device. Hereinafter, imprinting and unlocking will be described in detail.

(Imprinting and Unlocking)

Imprinting or obtaining of the sub key set [IDen, LKen] consisting of the sub lock key (LKen) and the sub ID (IDen) by the host device from the export-locked information storage device and unlocking the export-locked information storage device will now be described.

Figure 13:
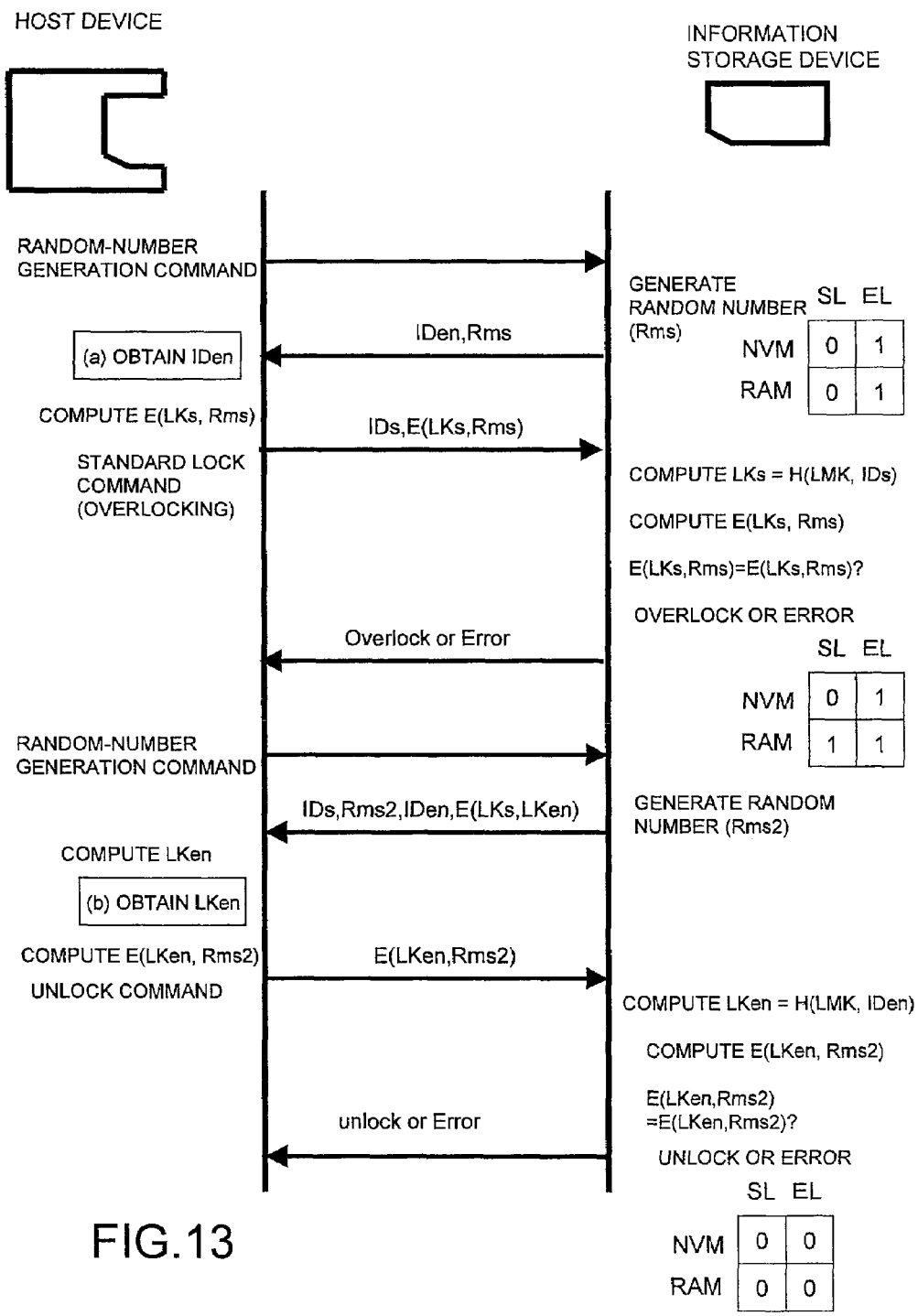
FIG. 13 is an illustration describing the sequence of a communication process performed between the information storage device and the host device in performing imprinting and unlocking the information storage device by applying the sub key set.

FIG. 13 shows the sequence of an imprinting and unlocking process performed between the host device and the information storage device. The host device and the information storage device are interconnected so as to transfer data with each other. As shown in the drawing, the lock status flags of the information storage device are set to EL=1 indicating that export locking is valid and stored in the NVM and RAM.

The host device has no sub key set [IDen, LKen] consisting of the sub ID (IDen) and the sub lock key (LKen) applied to export-locking of the information storage device. The information storage device stores the sub key set [IDen, LKen] in an export-key storage region. The information storage device is in a so-called export-locked status.

The host device outputs a random-number generation command to the information storage device. Upon reception of the random-number generation command, the information storage device generates a random number (Rms) of a predetermined length, for example, 16 bytes, and transmits the generated random number (Rms) and the sub ID (IDen), which has already been stored in the memory in the previous export locking process, that is, the sub ID (IDen) of the sub key set [IDen, LKen] applied to export locking, to the host device. The information storage device stores the generated random number (Rms) in the memory, such as the RAM, in the controller.

Upon reception of sub ID (IDen) and the random number (Rms) from the information storage device, the host device checks the received sub ID (IDen) against the primary ID (IDs) of the host device to see if the two IDs are equal. When the two IDs are equal, the information storage device can be unlocked by applying the primary lock key (LKs), which is similar to the above-described process in which LMK is applied (see FIG. 7).

When the received sub ID is unequal to the primary ID (IDs) of the host device, it means that the information storage device is locked by another host device. By imprinting or obtaining of the received sub ID (IDen) and the sub lock key (LKen), the host device can join the same group as the other host device that has performed export locking by applying the sub key set [IDen, LKen].

That is, the host device performs imprinting to obtain the sub ID (IDen) and the sub lock key (LKen) and stores these pieces of data as set data, that is, the sub key set [IDen, LKen], in the memory of the host device, thereby joining the group. By applying the obtained sub key set [IDen, LKen], the host device can unlock the export-locked information storage device. When performing imprinting, the host device stores the sub ID (IDen) received from the information storage device in the memory.

The host device that performs imprinting performs encryption E(LKs, Rms) of the received random number (Rms) using the primary lock key (LKs), which has already been stored in the memory in the host device, as an encryption key and transmits the result data, the primary ID (IDs), and a standard lock command to the information storage device. Since this locking process is to add, by applying the primary lock key (LKs), standard locking to the export-locked information storage device, which has been export-locked by applying the sub lock key (LKen), this locking process is referred to as overlooking.

Upon reception of the primary ID (IDs) and the encrypted data E(LKs, Rms) from the host device, the information storage device computes a hash value for the received primary ID (IDs) by applying the lock master key (LMK), thereby computing the primary lock key (LKs) associated with the primary ID (IDs). That is, the information storage device computes the primary lock key (LKs) associated with the primary ID (IDs):

$$LK=H(LMK, IDs).$$

The information storage device performs encryption E(LKs, Rms) of the random number Rms, which is stored in the memory of the information storage device, by applying the primary lock key (LKs) computed by the above-described hash-value computation and checks to see if this encrypted data is equal to the encrypted data E(LKs, Rms) received from the host device.

When the data E(LKs, Rms) received from the host device is equal to the encrypted data E(LKs, Rms) computed by the information storage device, it is verified that the command is an overlooking request from the host device that has the primary key set [IDs, LKs] serving as set data of the valid primary ID (IDs) and the primary lock key (LKs). Overlocking is performed, and an overlooking completion notification is transmitted to the host device.

When the data E(LKs, Rms) received from the host device is unequal to the encrypted data E(LKs, Rms) computed by the information storage device, it is determined that the host device is not a host device that has the primary key set [IDs, LKs] serving as set data of the valid primary ID (IDs) and the primary lock key (LKs), and that the command is an overlooking request from an unauthorized unit. Overlocking is not performed, and an error notification is transmitted to the host device.

Overlocking performed by the information storage device is to standard-lock the export-locked information storage device. The lock status flags of the information storage device in the NVM and the RAM are, as shown in the drawing, set to EL=1 indicating that export locking is valid. By performing overlooking, SL=1 indicating that standard locking is valid is set to the RAM. The flag information set in the RAM is copied to the NVM before power is turned off.

Upon reception of the overlooking completion notification, the host device performs imprinting and unlocking in succession. The host device again transmits a random-number generation command to the information storage device.

Upon reception of the random-number generation command, the information storage device generates a second random number (Rms2) and transmits the following associated pieces of data including IDs, Rms2, IDen, and E(LKs, LKen) to the host device, that is:

the generated random number (Rms2);

the primary ID (IDs) of the host device having performed standard locking;

the sub ID (IDen) applied to export locking; and encrypted data E(LKs, LKen) generated by encrypting the sub lock key (LKen) associated with the sub ID (IDen) using the primary lock key (LKs) associated with the primary ID (IDs).

The information storage device stores the generated random number (Rms2) in the memory, such as the RAM, in the controller.

Upon reception of the data including IDs, Rms2, IDen, and E(LKs, LKen) from the information storage device, the host device decrypts the encrypted data E(LKs, LKen) by applying the primary lock key (LKs) stored in the memory of the host device to obtain the sub lock key (LKen). This is the sub lock key (LKen) associated with the previously-obtained sub ID (IDen). The obtained sub key set [IDen, LKen] is stored in the memory. By performing imprinting, the host device joins the group No. n.

Continuously, the host device unlocks the information storage device. The host device encrypts the random number (Rms2) received from the information storage device on the basis of the sub lock key (LKen), which is obtained by decrypting, by applying the primary lock key (LKs), the encrypted data E(LKs, LKen) received from the information storage device, and generates encrypted data E(LKen, Rms2). The host device transmits the encrypted data E(LKen, Rms2) and an unlock command to the information storage device.

Upon reception of the unlock command and the encrypted data E(LKen, Rms2) from the host device, the information storage device computes a hash value for the sub ID (IDen), which has already been stored in the memory of the information storage device, by applying the lock master key (LKS), thereby computing the sub lock key (LKen) associated with the sub ID (IDen). That is, the information storage device computes the sub lock key (LKen) associated with the sub ID (IDen):

$LKen=H(LMK, IDen)$.

The information storage device performs encryption E(LKen, Rms2) of the random number Rms2, which is stored in the memory of the information storage device, by applying the sub lock key (LKen) computed by the above-described hash-value computation and checks to see if this encrypted data is equal to the encrypted data E(LKen, Rms2) received from the host device.

When the data E(LKen, Rms2) received from the host device is equal to the encrypted data E(LKen, Rms2) computed by the information storage device, it is verified that the command is a lock releasing request, that is, an unlocking request, from the host device that has set data of the valid sub ID (IDen) and the sub lock key (LKen). Unlocking is performed, and an unlocking completion notification is transmitted to the host device.

When the data E(LKen, Rms2) received from the host device is unequal to the encrypted data E(LKen, Rms2) computed by the information storage device, it is determined that the host device is not a host device that has the sub key set [IDen, LKen] serving as set data of the valid sub ID (IDen) and the sub lock key (LKen), and that the command is an unlocking request from an unauthorized unit. Unlocking is not performed, and an error notification is transmitted to the host device.

By unlocking the information storage device, the lock status flags are changed from EL=1 to EL=0. Standard locking, which serves as overlooking of the export-locked information storage device, is also released and SL=1 is changed to SL=0. That is, standard locking is released in accordance with releasing of export locking.

The sequence of changing the lock status flags is as follows. First, the flags stored in the RAM in the controller are rewritten. Subsequently, the flag information in the RAM is appropriately copied to the NVM before, for example, power is turned off. When power is turned on again, the flag information in the NVM is copied to the RAM. The controller performs access control based on the flag information in the RAM.

Figure 14:
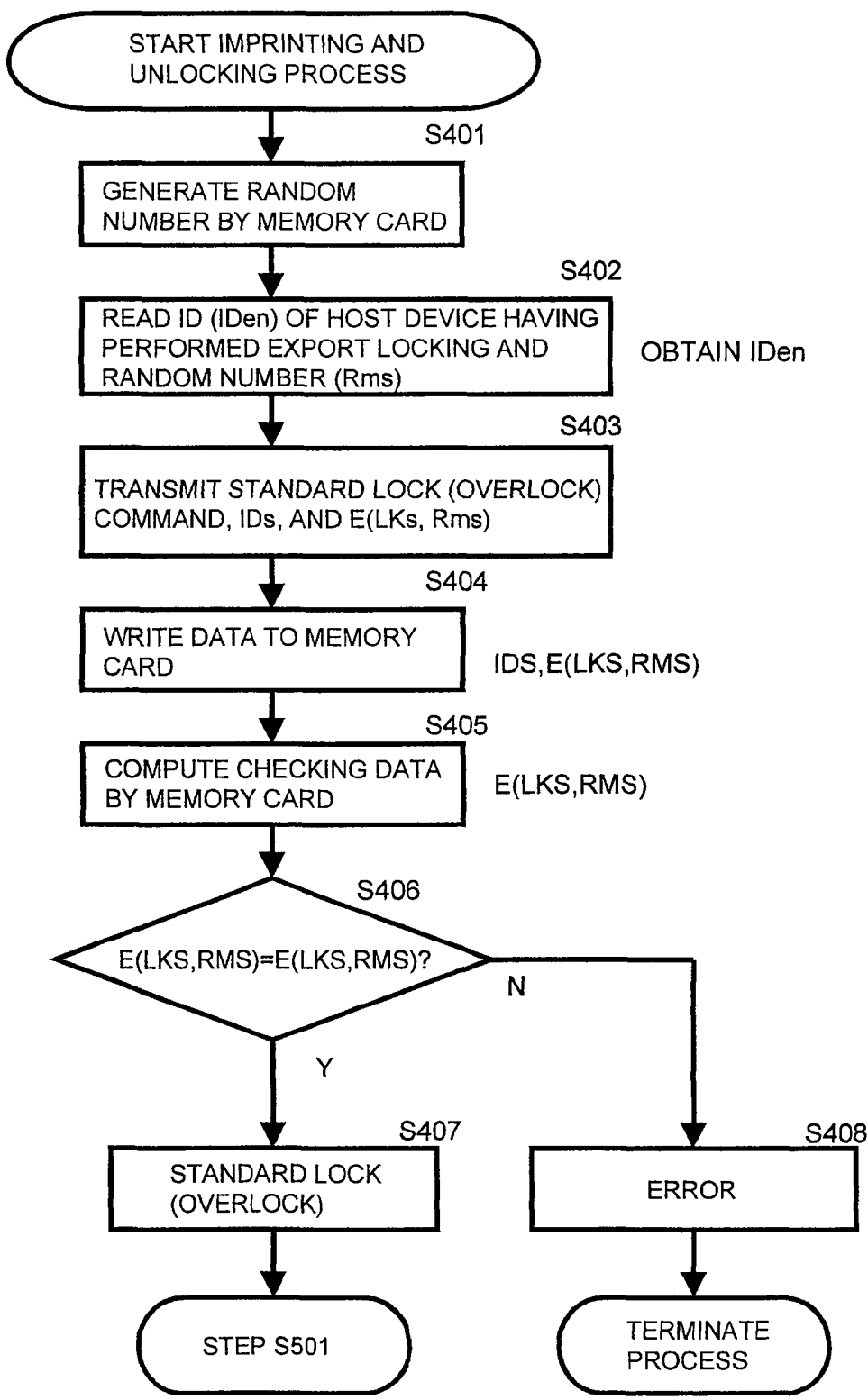
FIG. 14 is a flowchart describing a process of imprinting and unlocking the information storage device by applying the sub key set.

Referring to the flowcharts of FIGS. 14 and 15, the steps of a process of imprinting or obtaining the sub key set [IDen, LKen] consisting of the sub lock key (LKen) and the sub ID (IDen) from the export-locked information storage device and unlocking the export-locked information storage device will now be described.

In step S401, the memory card serving as the information storage device generates a random number (Rms) in response to reception of a random-number generation request command from the host device. In step S402, the generated random number and the sub ID (IDen), which has been transmitted from the host device that has performed export locking to the information storage device and which has been stored in the export-lock-key-set storage region of the memory of the information storage device, are read by the host device. At this time, the host device obtains the sub ID (IDen) of the sub key set [IDen, LKen].

Since it is determined by the host device that the sub ID (IDen) read from the memory card is unequal to the primary ID (IDs) of the host device, the host device determines that the information storage device is not standard-locked, but export-locked. In step S403, the host device transmits, in addition to a standard lock command (serving as overlooking), encrypted data E(LKs, Rms) generated by encrypting the received random number (Rms) using the primary lock key (LKs) of the host device and the primary ID (IDs) of the host device to the memory card serving as the information storage device.

In step S404, the information storage device (memory card) writes the primary ID (IDs) and the encrypted data E(LKs, Rms), which are received from the host device, into the memory in the information storage device. In step S405, the memory card computes a hash value for the received primary ID (IDs) by applying the lock master key (LMK) stored in the memory of the memory card, thereby computing the primary lock key (LKs) associated with the primary ID (IDs). That is, the memory card computes the primary lock key (LKs) associated with the primary ID (IDs):

$H(LMK, IDs)=LKs$.

On the basis of the computed primary lock key (LKs), the memory card encrypts the random number (Rms), which is previously generated in step S401, and generates encrypted data E(LKs, Rms) serving as checking data.

In step S406, the memory card performs comparing and checking [E(LKs, Rms)=E(LKs, Rms)?] of the encrypted data E(LKs, Rms) computed in step S405 and the encrypted data E(LKs, Rms) received from the host device in addition to the standard lock command in step S403 and stored in the memory in step S404 to see if the two pieces of data are equal.

When these two values are equal as determined by the comparing and checking, the host device is verified as a valid unit that has the primary key set [IDs, LKs] serving as set data of the valid, correct primary ID (IDs) and the primary lock key (LKs). In step S407, standard locking in response to the standard lock command is performed. This corresponds to overlooking in which the export-locked information storage device is standard-locked. The lock status flags of the information storage device in the RAM are set to EL=1 and SL=1 indicating that export locking and standard locking are both valid.

When the two values are unequal as determined in step S406 by the comparing and checking, in step S408, it is determined that the host device having transmitted the standard lock command is not a host device that has the primary key set [IDs, LKs] serving as set data of the valid primary ID (IDs) and the primary lock key (LKs). Overlocking is not performed, and an error notification is transmitted to the host device.

Figure 15:
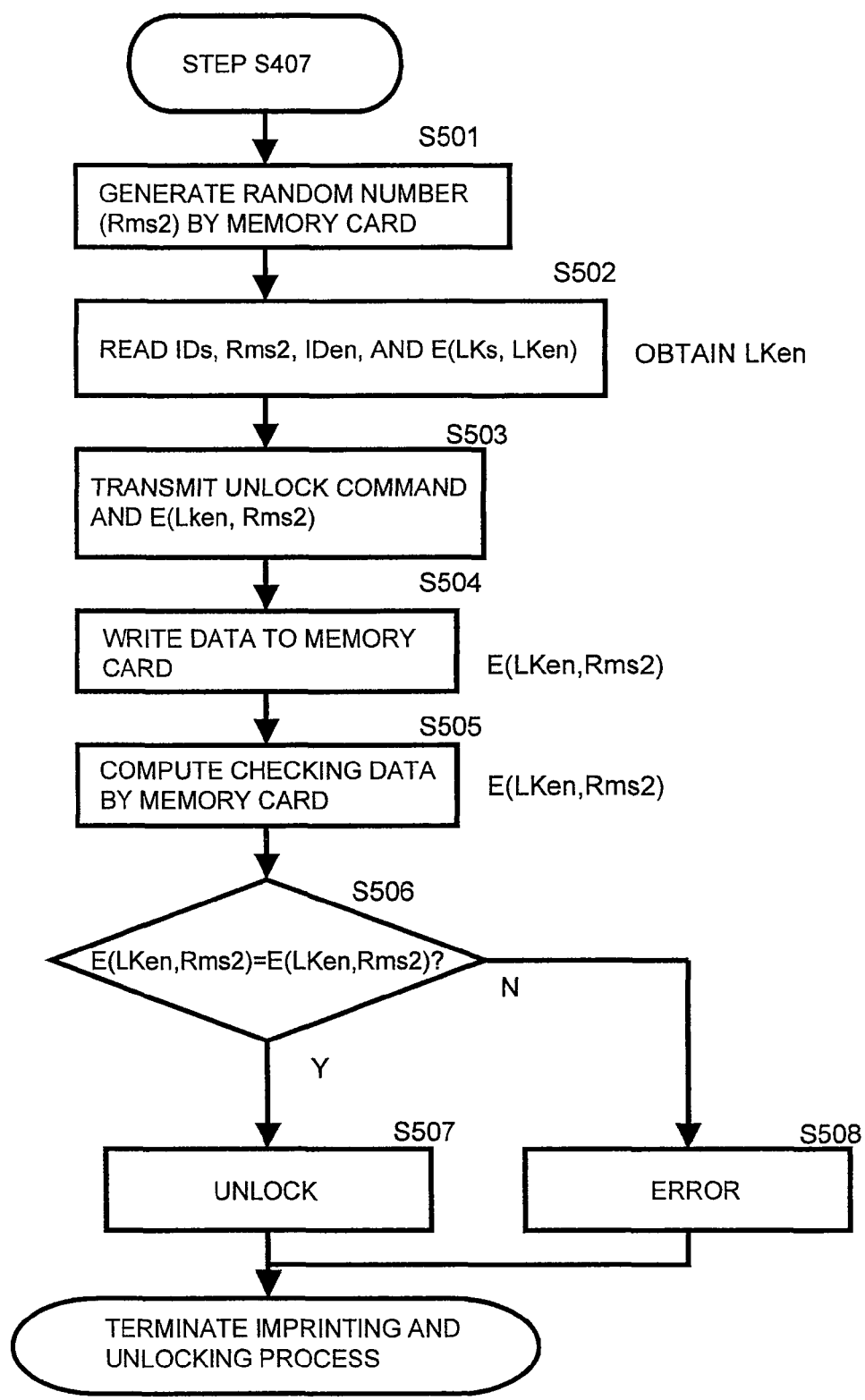
FIG. 15 is a flowchart describing a process of imprinting and unlocking the information storage device by applying the sub key set.

When standard locking serving as overlooking is performed in step S407, the process proceeds to step S501 of FIG. 15 when imprinting and unlocking are to be performed.

Upon reception of an overlooking completion notification, the host device again transmits a random-number generation command to the information storage device. Upon reception of the random-number generation command, in step S501, the information storage device generates a second random number (Rms2). In step S502, the host device reads the following associated pieces of data [IDs, Rms2, IDen, and E(LKs, LKen)] from the information storage device:

the generated random number (Rms2);

the primary ID (IDs) of the host device having performed standard locking;

the sub ID (IDen); and encrypted data E(LKs, LKen) generated by encrypting the sub lock key (LKen) of set data associated with the sub ID (IDen) using the primary lock key (LKs) of set data associated with the primary ID (IDs).

In step S503, the host device transmits a lock releasing request or an unlock command to the information storage device. The host device transmits this unlock command in addition to encrypted data E(LKen, Rms2).

The encrypted data E(LKen, Rms2) is generated by the following steps. In step S502, the host device reads the data including IDs, Rms2, IDen, and E(LKs, LKen) from the information storage device. The host device decrypts the encrypted data E(LKs, LKen) by applying the primary lock key (LKs) stored in the memory of the host device to obtain the sub lock key (LKen). This is the sub lock key (LKen) associated with the previously-obtained sub ID (IDen). On the basis of the sub lock key (LKen), the host device encrypts the random number (Rms2) received from the information storage device to generate encrypted data E(LKen, Rms2).

The host device stores the obtained sub key set [IDen, LKen] in the memory, and imprinting is thus completed. In other words, the host device performs imprinting to join the group No. n.

In step S504, the information storage device having received the encrypted data E(LKen, Rms2) from the host device writes the received data E(LKen, Rms2) to the memory. In step S505, the information storage device computes checking data.

The checking data is computed by the following steps. A hash value is computed for the sub ID (IDen), which is stored in the memory of the information storage device, by applying the lock master key (LMK), thereby computing the sub lock key (LKen) associated with the sub ID. That is, the sub lock key (LKen) associated with the sub ID (IDen) is computed:

$$LKen = H(LMK, IDen).$$

The information storage device performs encryption E(LKen, Rms2) of the random number Rms2, which is generated in step S501 and which is stored in the memory, by applying the sub lock key (LKen) computed by the above-described hash-value computation, thereby generating checking data.

In step S506, the information storage device compares the checking data E(LKen, Rms2) with the encrypted data E(LKen, Rms2) received from the host device to check whether they are equal.

When the data E(LKen, Rms2) received from the host device is equal to the encrypted data E(LKen, Rms2) computed by the information storage device, it is determined that the command is a lock releasing request, that is, an unlocking request, from the host device that has the sub key set [IDen, LKen] serving as set data of the valid sub ID (IDen) and the sub lock key (LKen). In step S507, unlocking is performed, and an unlocking completion notification is transmitted to the host device. When the two pieces of data are unequal, it is determined that the host device is not a host device that has the valid sub key set [IDen, LKen] and that the command is an unlocking request from an unauthorized unit. Unlocking is not performed. In step S508, an error notification is transmitted to the host device.

According to this example of the process, a plurality of host devices has the common sub key set [IDen, LKen] and can lock and unlock one information storage device (memory card). When the information storage device is export-locked, the sub key set [IDen, LKen] can be copied and stored in another host device via the information storage device. Accordingly, a group can be formed in a flexible manner. Copying or imprinting of the sub key set [IDen, LKen] in the host device can be performed provided that the host device has the valid primary ID (IDs) and the primary lock key (LKs) and that the host device can perform overlooking. This prevents copying (imprinting) of the sub key set [IDen, LKen] to an unauthorized unit.

As has been described with reference to FIG. 10(c), standard locking by applying the sub key set [IDen, LKen] (=group locking) is also implementable. When group locking is performed, the sub key set [IDen, LKen] is stored in the standard-lock-key storage region of the information storage device (see FIG. 10) and cannot be copied or output to another host device. In other words, only the host device that has already obtained the same sub key set [IDen, LKen] can access the information storage device by performing normal unlocking that involves no imprinting.

[Maintaining Lock Status Flags]

In the above described [locking by unit group], when the export-locked information storage device is unlocked, all the lock status flags are reset, that is, EL=0 indicating that export locking is released and SL=0 indicating that standard locking is released are set in the NVM and the RAM. While EL=0 and SL=0 are set, when power is turned off and then on, since EL=0 and SL=0 have been set in the NVM, SL=0 and EL=0 are also set in the RAM in the controller. All the lock statuses are released, and each host device can access the memory without authentication.

When such an unlocked information storage device is stolen or lost and falls into the wrong hands of an unauthorized third-party user, this unauthorized third-party user can access the memory without authentication. Such circumstances are unfavorable when secret information is stored.

In view of the foregoing problem, the following example will now be described. Even when the export-locked information storage device is unlocked by the host device and then turned off, the information storage device remains export-locked. When power is again turned on, memory access to the information storage device is permitted provided that export locking is released.

In this example, as in the previous description of [locking by unit group] with reference to FIG. 9, the primary key set [IDs, LKs] consisting of the primary ID (IDs) and the primary lock key (LKs) is stored in the memory, such as the ROM, in the host device. At least one sub key set [IDen, LKen] serving as set data of the sub ID and the sub lock key, which can be applied to export locking, can be stored in the memory, such as the ROM, in the host device. The lock master key (LMK) is stored in the memory, such as the ROM, in the controller in the information storage device. The lock master key (LMK) stored in the information storage device and the ID (including IDs and IDen) and the lock key (LK (including LKs and LKen)) stored in the host device have the following relationship:

$$LK=H(LMK, ID).$$

Locking and unlocking based on the primary ID (IDs) and the primary lock key (LKs) by the host device are performed in a sequence similar to that described in the previously-described [process based on lock master key (LMK)]. Locking based on the sub ID (IDen) and the sub lock key (LKen) is performed in a sequence similar to that described in the previously-described [locking by unit group]. Maintaining of the lock status flags in imprinting and unlocking in this example of the process will now be described.

(Maintaining Lock Status Flags in Imprinting and Unlocking)

Figure 16:
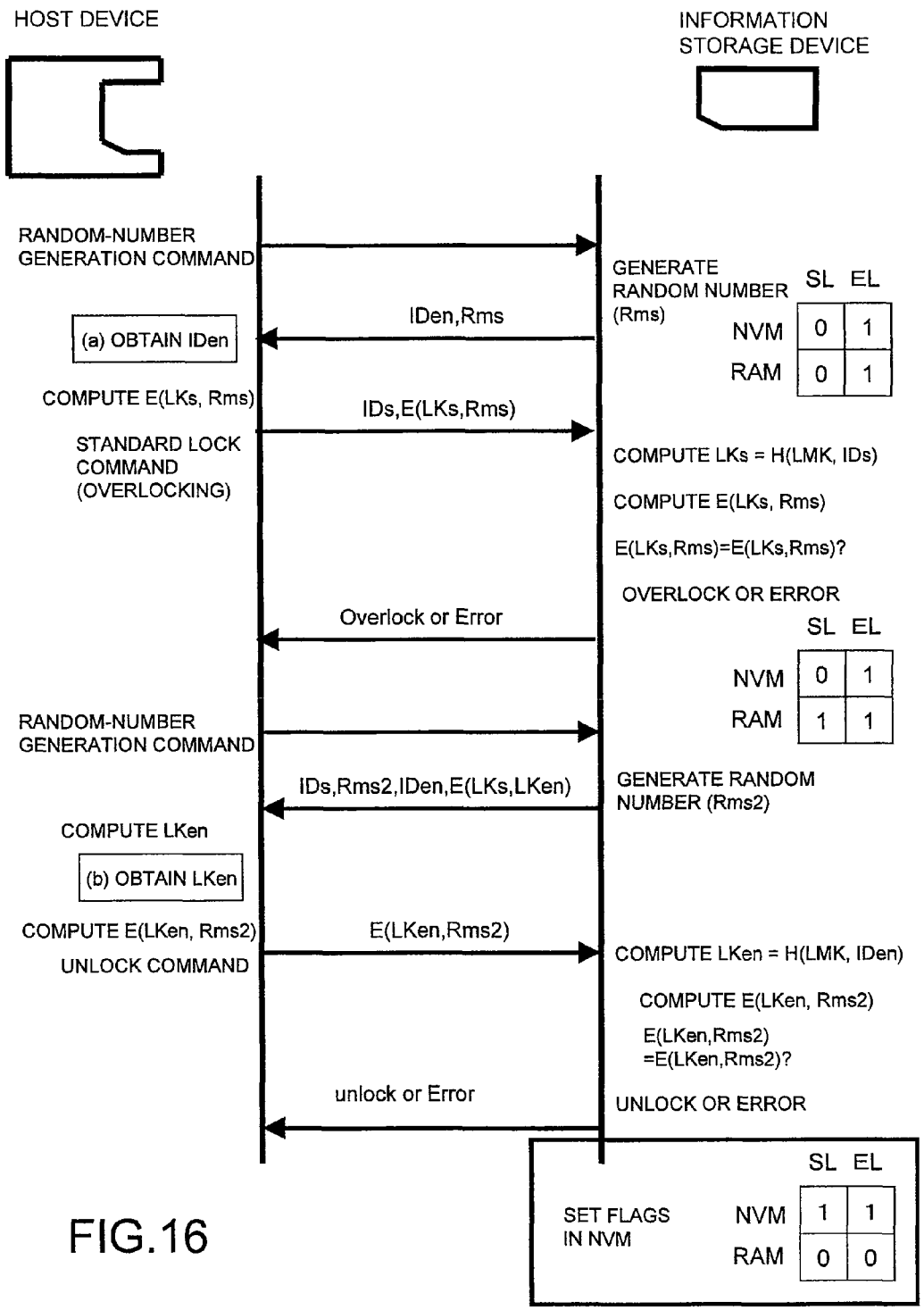
FIG. 16 is an illustration describing the sequence of a communication process performed between the information storage device and the host device in performing imprinting and unlocking the information storage device by applying the sub key set.

With reference to FIG. 16 and so forth, imprinting or obtaining of the sub key set [IDen, LKen] consisting of the sub lock key (LKen) and the sub ID (IDen) by the host device from the export-locked information storage device, unlocking of the export-locked information storage device, and maintaining of the lock status flags by the information storage device will now be described.

The sequence diagram shown in FIG. 16 is basically the same as that described with reference to FIG. 13 showing the process of imprinting and unlocking the export-locked information storage device, which is performed between the host device and the information storage device. The steps of the process are also the same.

The sequence diagram shown in FIG. 16 differs from that shown in FIG. 13 in that the information storage device sets the flags in the NVM after transmitting the unlocking completion notification in the last step of the sequence diagram. Specifically, in the process described in the previously-described [locking by unit group], when the export-locked information storage device is unlocked, EL=0 indicating that export locking is released and SL=0 indicating that standard locking is released are set in the NVM and the RAM. In contrast, according to this process, EL=1 and SL=1 indicating that the information storage device is export-locked and standard-locked are set in the NVM.

Figure 17:
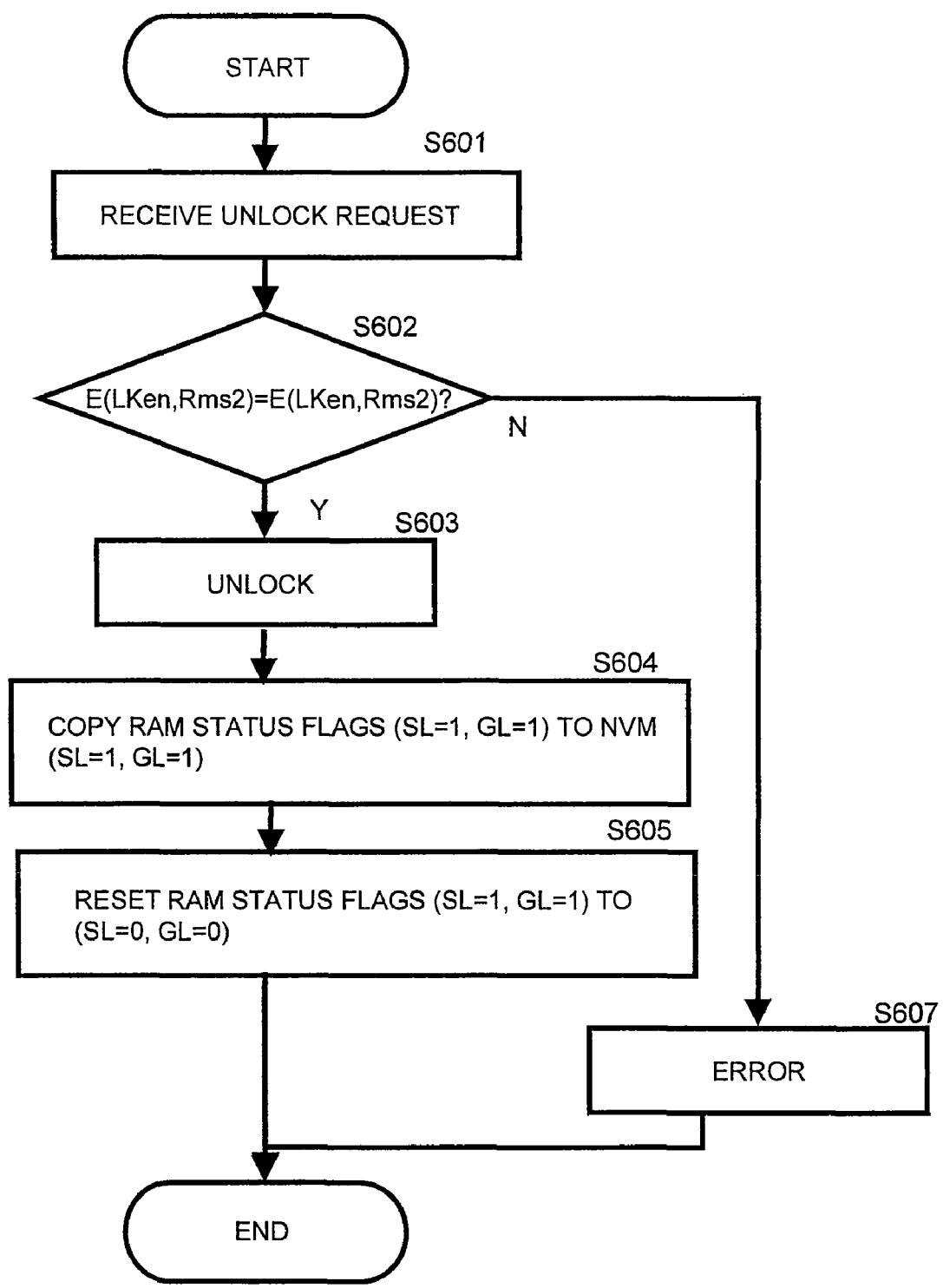
FIG. 17 is a flowchart describing a process of updating lock status flags in performing imprinting and unlocking the information storage device by applying the sub key set.

Referring to FIG. 17, a process of setting the lock status flags in the NVM will now be described in detail. The flow of the process shown in FIG. 17 is the flow describing the steps of the process performed by the information storage device after receiving a lock releasing request (unlock command) in the sequence diagram shown in FIG. 16 (similar to FIG. 13).

In step S601, the information storage device (memory card) receives a lock releasing request (unlock command). The information storage device determines whether to execute the unlock command. In step S602, the information storage device checks encrypted data E(LKen, Rms2) received from the host device in addition to the unlock command against encrypted data E(LKen, Rms2) generated by the information storage device. This is similar to that described in [locking by unit group].

When the data E(LKen, Rms2) received from the host device is unequal to the encrypted data E(LKen, Rms2) computed by the information storage device, in step S607, an error notification is transmitted to the host device. The process is terminated.

In contrast, when the data E(LKen, Rms2) received from the host device is equal to the encrypted data E(LKen, Rms2) computed by the information storage device, it is determined that the command is an unlocking request from the host device that has the valid sub key set [IDen, LKen]. In step S603, unlocking is performed, and an unlocking completion notification is transmitted to the host device.

In step S604, the information storage device (memory card) copies the lock status flags (SL=1 and EL=1) stored in the RAM in the controller to the NVM and sets the lock status flags in the NVM to SL=1 and EL=1 where SL=1 indicates that the information storage device is standard-locked and EL=1 indicates that the information storage device is export-locked.

After the completion of copying the flags in step S604, in step S605, the lock status flags (SL=1 and EL=1) in the RAM in the controller are reset, that is, the lock status flags in the RAM are set to SL=0 and EL=0 where SL=0 indicates that the information storage device is not standard-locked and EL=0 indicates that the information storage device is not export-locked.

In this status, that is, when the lock status flags in the RAM are set to SL=0 and EL=0, memory access becomes freely available, that is, access to the memory (memory 220 of FIG. 3) in the information storage device becomes available to the host device that has unlocked the information storage device.

When the information storage device (memory card) is removed from the host device and power supply to the information storage device (memory card) is stopped and when power is again turned on, the lock status flag information (SL=1 and EL=1) set in the NVM is loaded into the RAM in the controller. The controller performs a process based on the lock status flags (SL=1 and EL=1) set in the RAM. With reference to the process flow shown in FIG. 18, a process performed after the information storage device is again turned on will now be described.

Figure 18:
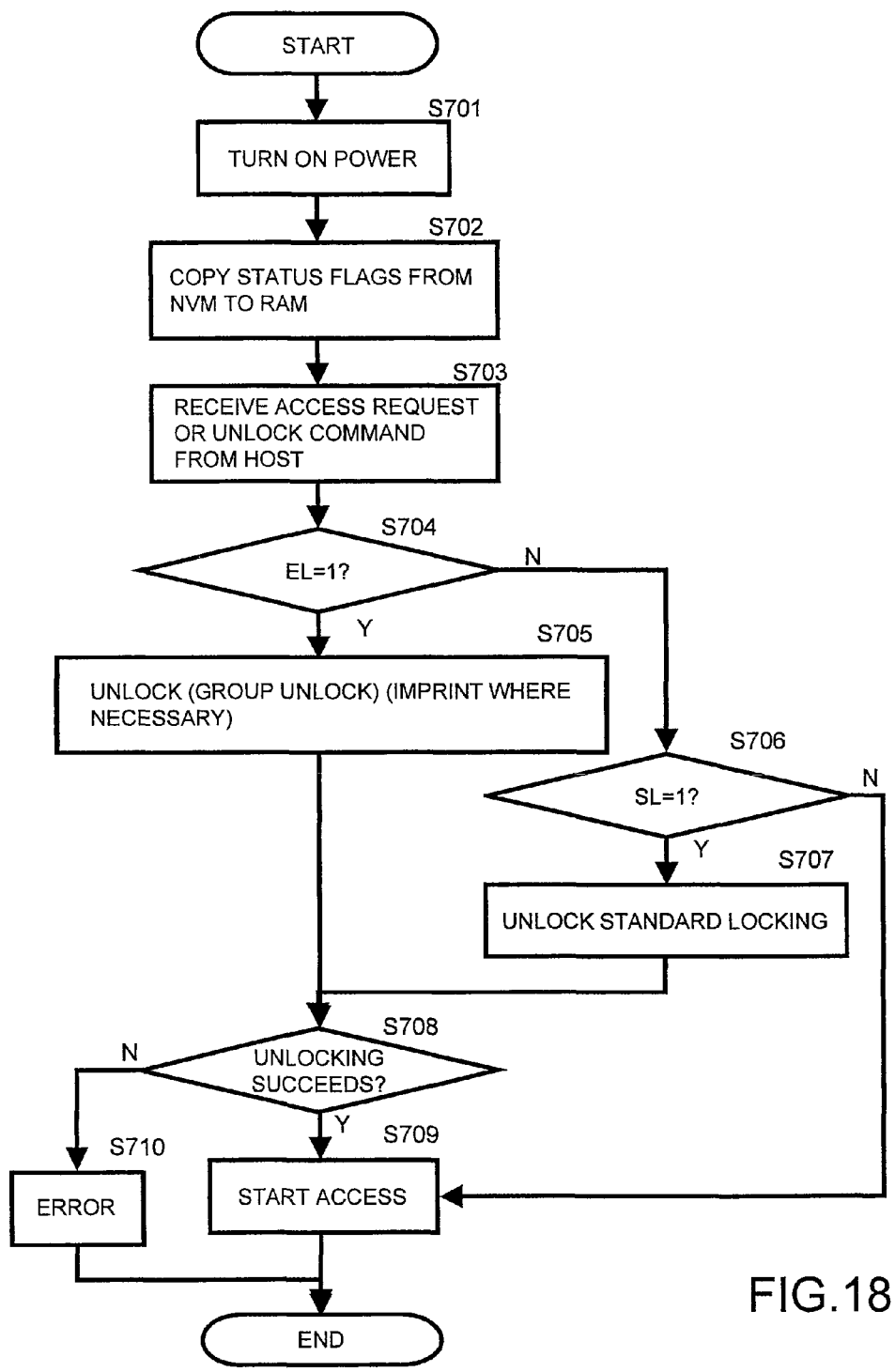
FIG. 18 is a flowchart describing a process of referring to the lock status flags in unlocking the information storage device.

The process flow shown in FIG. 18 shows a process performed when the information storage device is turned off and then on.

In step S701, the information storage device (memory card) is placed in the host device and changes from a power-OFF status to an ON status. In step S702, the information storage device copies the lock status flags (SL and EL) stored in the NVM to the RAM in the controller. The controller performs control based on the status flags in the RAM.

In step S703, the information storage device receives a memory access request or an unlock command from the connected host device. The controller of the information storage device refers to the lock status flags in the RAM.

When it is determined in step S704 that the status flag in the RAM is EL=1, in step S705, unlocking (see FIGS. 13 to 15) is performed. When the host device does not have the sub key set [IDen, LKen] applied to export locking of the information storage device, the host device must perform imprinting. When it is determined by verification described with reference to FIGS. 13 to 15 that the command is an unlock request from the valid host device, unlocking is performed (Yes in step S708). In step S709, memory access is permitted. When it is determined by the verification that the command is an unlock request from an unauthorized host device, unlocking is not performed (No in step S708), and an error notification is transmitted (S710).

When it is determined in step S704 that the status flag in the RAM is EL=0, in step S706, it is determined whether the status flag in the RAM is SL=1. When it is determined that the status flag in the RAM is SL=1, in step S707, standard locking is released (see FIGS. 7 and 8). When it is determined by verification described with reference to FIGS. 7 and 8 that the command is an unlock request from the valid host device, unlocking is performed (Yes in step S708). In step S709, memory access is permitted. When it is determined by the verification that the command is an unlock request from an unauthorized host device, unlocking is not performed (No in step S708), and an error notification is transmitted (S710).

When it is determined in step S704 that the status flag in the RAM is EL=0 and when it is determined in step S706 that the status flag in the RAM is SL=0, the information storage device is not locked. In step S709, memory access is permitted.

As has been described with reference to FIGS. 16 and 17, when the export-locked information storage device is unlocked by a host device and then the information storage device is turned off, the lock status flags in the NVM are set to SL=1 and EL=1. Upon subsequent power activation, the lock status flags in the RAM are set to SL=1 and EL=1. Accordingly, the determination (EL=1?) in step S704 of the process flow of FIG. 18 is Yes. The processing in step S705 is performed. That is, memory access is permitted provided that the export-locked information storage device is unlocked (see FIGS. 13 to 15).

As has been described above, according to this example of the process, the lock status flags, which include status information based on which it is determined whether the information storage device is export-locked (EL) in which the key set applicable to locking or unlocking can be output or standard-locked (SL) in which the key set applicable to locking or unlocking cannot be output, prior to unlocking are stored in the NVM. When the information storage device is turned off and then on, the lock status prior to unlocking is faithfully recreated on the basis of the flags stored in the NVM.

According to the example of the process, for example, even when the export-locked information storage device is unlocked by a host device, the export-locked status is maintained. When the information storage device is turned off and then on, memory access is permitted provided that unlocking is performed. Unlocking can be performed only when a host device that has the valid primary key set [IDs, LKs] performs a predetermined process including the above-described overlooking. Access from an unauthorized unit is prevented.

[Automatic Locking by Detecting Reading of Specific Data Region]

An example of a process in which reading of data by the host device from the information storage device (memory card) is monitored by the controller of the information storage device and locking is performed in response to a trigger, that is, reading of a predetermined data region (e.g., a specific cluster), will now be described.

Reading of data stored in the memory (memory 220 of FIG. 2) of the information storage device (memory card) is managed by, for example, a playback management file (PBLIST) generated in accordance with the stored data. In accordance with the playback management file, the controller reads data from the memory (memory 220 of FIG. 2) and outputs the data to the host device.

When data is read, the controller of the information storage device can monitor the data being read. For example, audio data compressed in ATRAC3 can be monitored in predetermined units, such as clusters serving as units of data being read.

Figure 19:
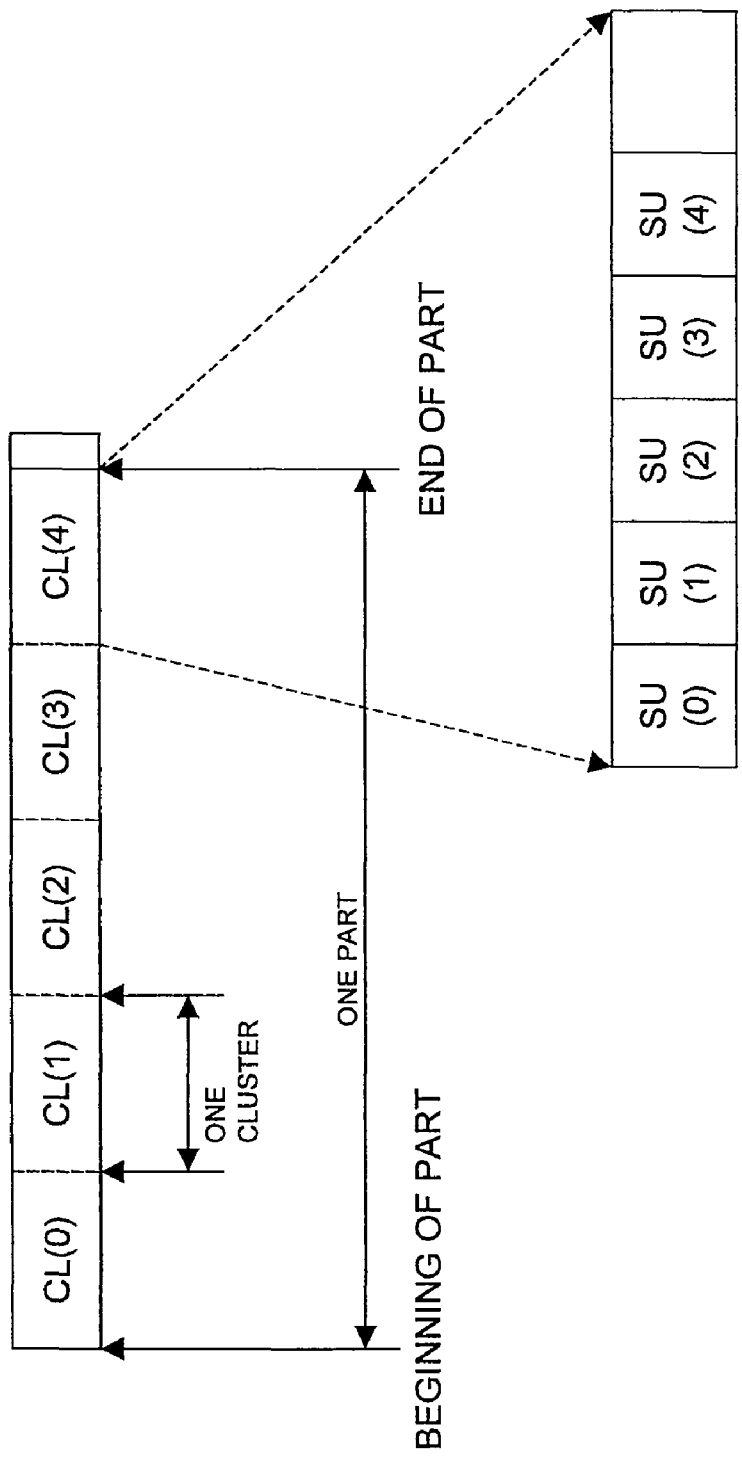
FIG. 19 is an illustration describing the cluster structure serving as the data storage format of the information storage device.

As shown in FIG. 19, audio data compressed in ATRAC3 consists of parts, each part consisting of plural clusters, each cluster consisting of plural SUs (sound units) serving as the minimum data units. Each SU (sound unit) includes data of several hundred bytes, which is generated by compressing audio data of 1024 samples (1024×16 bits×2 channels) obtained at a sampling frequency of 44.1 kHz to approximately one tenth. Each cluster includes data consisting of plural SUs (e.g., 42 SUs). One cluster consisting of 42 SUs represents a sound lasting approximately one second.

Each cluster is given a unique logical number and managed by this logical number. The controller 210 of the information storage device (see FIG. 3) checks whether a specific cluster is read on the basis of the logical number. For example, when output data is music content, the logical number of at least one cluster corresponding to the introduction or refrain of the music content is extracted as a locking-associated cluster associated with the content. The extracted cluster logical number is set as registration information associated with the content and stored in the memory (flash memory) storing the content.

Upon reading of the content, the registration information is temporarily stored in the memory (RAM) in the controller of the information storage device. The controller checks each cluster of the read content against the locking-associated cluster. When the cluster of the read content corresponds to the logical number of the locking-associated cluster, locking is performed. Locking can be performed at various times, such as the time at which reading of the locking-associated cluster starts, the time at which reading of the locking-associated cluster ends, or the time at which reading of the entire content including the locking-associated cluster ends. Detection in accordance with the settings is performed, and locking is performed on the basis of detection of the control settings. When locking is performed, re-reading must be performed provided that unlocking is performed.

Figure 20:
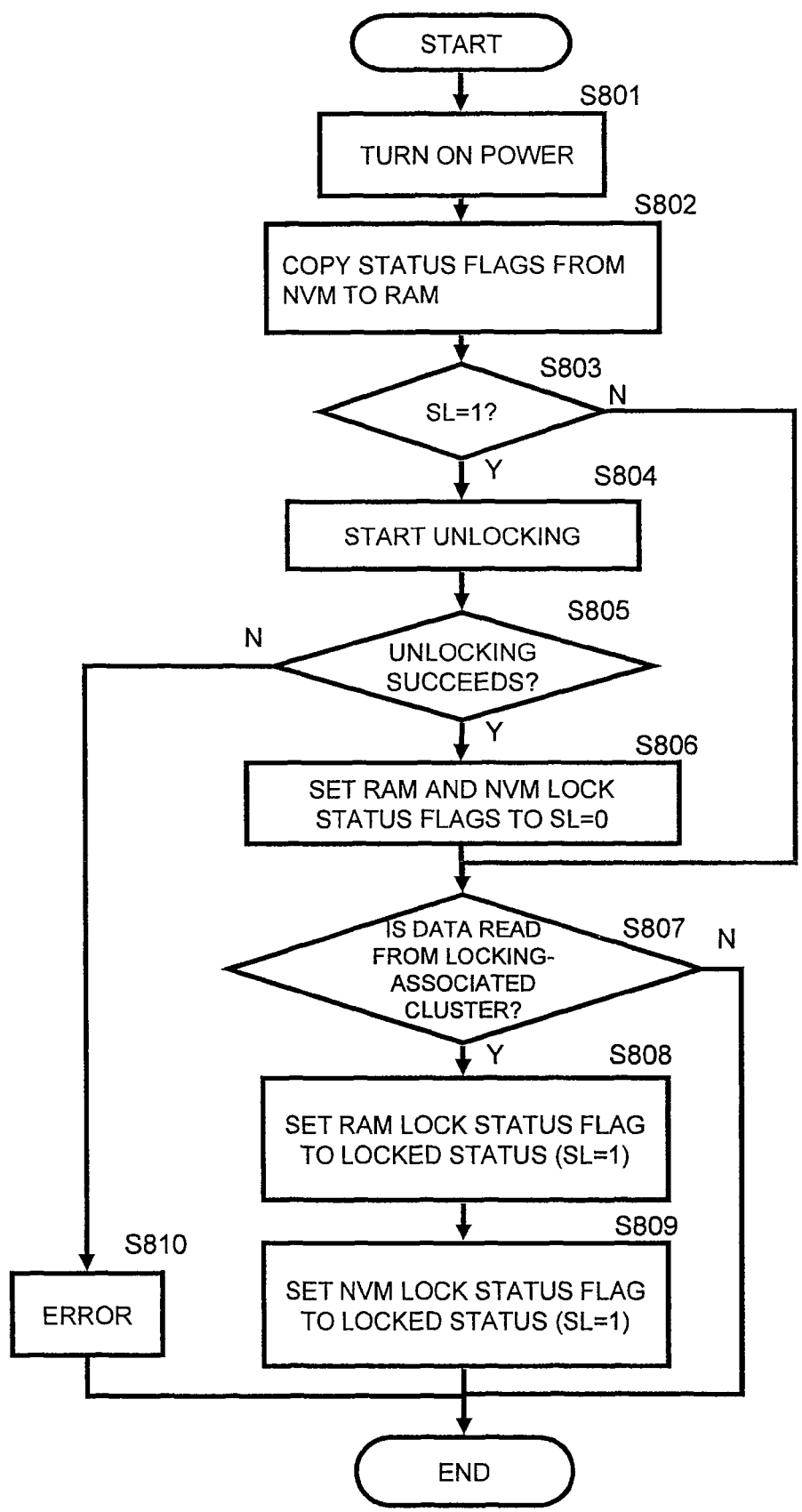
FIG. 20 is a flowchart describing a locking process based on reading of a specific data region (cluster).

Referring to FIG. 20, a locking process performed by the controller 210 of the information storage device provided that a specific data region (e.g., a specific cluster) is read from the memory 220 (see FIG. 3) will now be described.

Although the process flow of FIG. 20 only includes standard locking (SL) in order to simplify the description, a similar process can be performed in the case of export locking (EL).

In step S801, the information storage device is turned on. In step S802, the lock status flags stored in the NVM are copied and stored in the RAM 213 of the controller 210 (see FIG. 3). The controller performs control in accordance with the status flags in the RAM 213.

In step S803, it is determined whether the information storage device is standard locked (SL=1). When SL=1, in step S804, the information storage device is unlocked. Unlocking is, for example, similar to that described with reference to FIGS. 7 and 8.

When it is determined by verification by the information storage device that the host device has the valid primary ID and the primary lock key and when unlocking succeeds (Yes in S805), the process proceeds to step S806. When unlocking fails, in step S810, an error notification is transmitted to the host device, and the process is terminated.

Provided that unlocking succeeds, in step S806, the lock status flags in the RAM and the NVM are updated, that is, the lock status flags are set to SL=0 indicating that the lock is released.

When the host device starts reading data, in step S807, the controller of the information storage device monitors whether the predetermined locking-associated cluster is read. When reading of the data from the locking-associated cluster is detected, in step S808, the lock status flag in the RAM 213 of the controller 213 (see FIG. 3) is set to a locked status (SL=1). In step S809, the lock status flag in the NVM is set to a locked status (SL=1).

By reading the predetermined cluster, the information storage device is locked. When re-reading is performed afterwards, unlocking must be performed. Unlocking can be performed only by a host device that has the same primary ID (IDs) and the same primary lock key (LKs) as those used in locking the information storage device. This prevents unlimited use of the locked information storage device (memory card).

The locking information may be set to be released when the information storage device is turned off. Alternatively, as described above, the lock status flags are held in the NVM even when power is off. When power is again turned on, the lock status flags in the NVM are copied to the RAM in the controller, thereby maintaining and recreating the lock status prior to power-off.

According to this example of the process, when data is read subsequent to unlocking, so-called read-once access control is implemented in which reading is permitted only once.

In the example of the process of FIG. 20, only standard locking is shown. However, a similar process can be performed in the case of export locking. That is, the information storage device may be export-locked in response to a trigger, that is, reading of a predetermined data region.

[Lock-Status Presentation on Host Device]

In the host device for accessing the information storage device, which can be in various lock statuses, a presentation structure and process for detecting the lock status of the information storage device will now be described.

FIG. 21 shows an example of the structure of a locking/unlocking unit that has lock status presentation indicators and various process switches. A locking/unlocking unit 720 with an interface through which data can be transferred with a memory card 710 serving as an information storage device has the following lock-status indicators:

an Unlocked indicator 721 indicating an unlocked status;
a Locked indicator 722 indicating a locked status;
an E-Locked indicator 723 indicating an export-locked status; and
an ERR indicator 724 indicating an error notification.

The various process requesting switches include:
an Unlock switch 731 serving as an unlocking request switch;
a P-Lock switch 732 serving as a switch requesting standard locking using a primary key set;
a G-Lock switch 733 serving as a switch requesting standard locking (group locking) using a sub key set; and
an E-Lock switch 734 serving as a switch requesting export locking using the sub key set.

An example of a locking/unlocking unit shown in FIG. 21(b) includes, in addition to the above-described switches, an Imprint switch 735 serving as a switch exclusively requesting imprinting, which is storing the sub key set [IDen, LKen] consisting of the sub ID (IDen) and the sub lock key (LKen), which are stored in the export-locked information storage device, in the host device.

In FIG. 21, the indicators and the process requesting switches of the locking/unlocking unit are shown. As has been described above, the host device includes various units including information processing apparatuses, such as a PC, a PDA, and the like; a digital camera, such as a DSC; and a mobile communication terminal. Each of these units can transmit a command to the information storage device (memory card) via input means thereof. The lock status can be displayed on an LCD or the like of each of these units or can be reported by sound, alarm, or the like.

Figure 22:
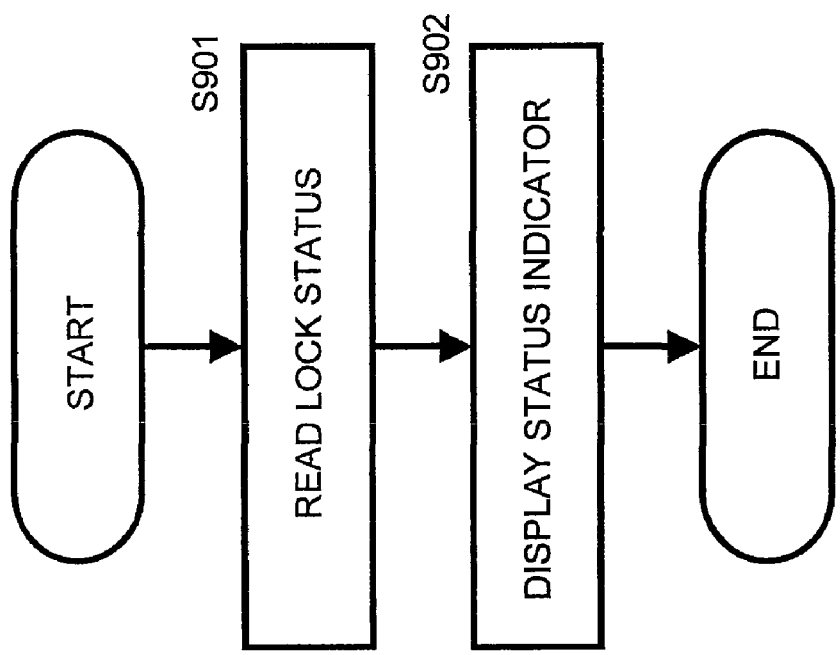
FIG. 22 is a flowchart describing a process of reading the lock status by the host device.

Referring to FIG. 22 and so forth, a process of presenting the lock status by the host device and transmitting a command from the host device to the information storage device (memory card) will now be described.

FIG. 22 shows a flow describing a process of reading the lock status when, for example, the information storage device (memory card) is connected to the host device. The lock-status reading process may be performed in response to a command input from a user or may be performed automatically when the information storage device (memory card) is connected to the host device.

In step S901, the lock status is read from the information storage device. This status information is based on the lock status flags stored in the RAM 213 of the controller 210 of the information storage device (see FIG. 3). In step S902, on the basis of the read lock-status information, one of the indicators 721 to 724 associated with the lock status is turned on. In other words, when the information storage device is standard-locked or group-locked, the Locked indicator 722 indicating a locked status is displayed (turned on). When the information storage device is export-locked, the E-Locked indicator 723 indicating an export-locked status is displayed (turned on). When the information storage device is not locked, the Unlocked indicator 721 indicating an unlocked status is displayed (turned on).

Figure 23:
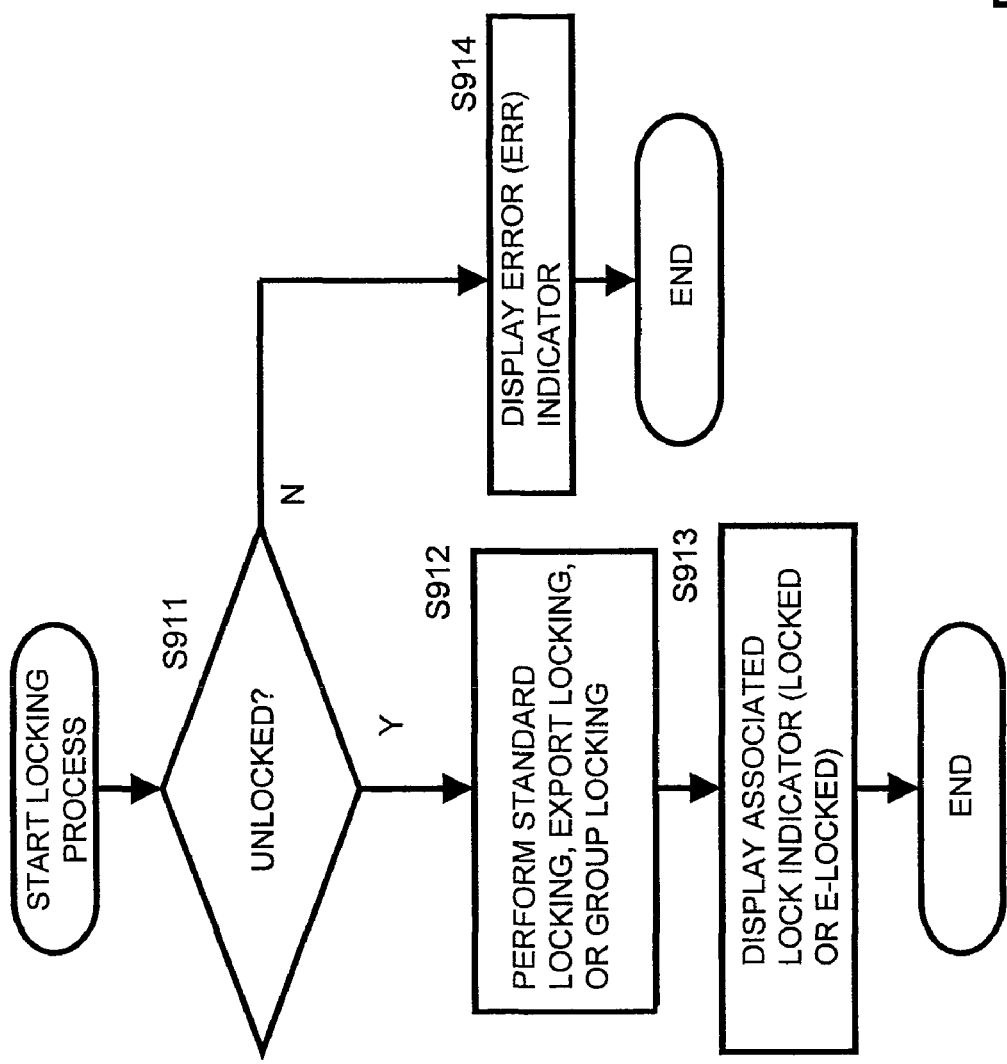
FIG. 23 is a flowchart describing a process performed by the host device when locking the information storage device and an indicator displaying process.

Referring to FIG. 23, a process of displaying the indicators on the basis of a locking request and execution of locking will now be described. Locking is performed on the basis of an input from one of the process requesting switches 732 to 734 shown in FIG. 21.

A request for standard locking by applying the primary key set [IDs, LKs] consisting of the primary ID (IDs) and the primary lock key (LKs) is made by an input from the S-Lock switch 732. A request for export locking by applying the sub key set [IDen, LKen] consisting of the sub ID (IDen) and the sub lock key (LKen) is made by an input from the E-Lock switch 734. A request for standard locking by applying the sub key set [IDen, LKen], that is, group locking, is made by an input from the G-Lock switch 733.

When any one of these inputs is received, in step S911, the lock status of the information storage device (memory card) is detected. When the information storage device is not unlocked, in step S914, the error (ERR) indicator is displayed. When the information storage device is unlocked, in step S912, any one of standard locking, export locking, and group locking is performed. After the completion of locking, the associated lock indicator of the host device, that is, the Locked indicator 722 indicating a locked status or the E-Locked indicator 723 indicating an export-locked status is displayed in step S913.

Figure 24:
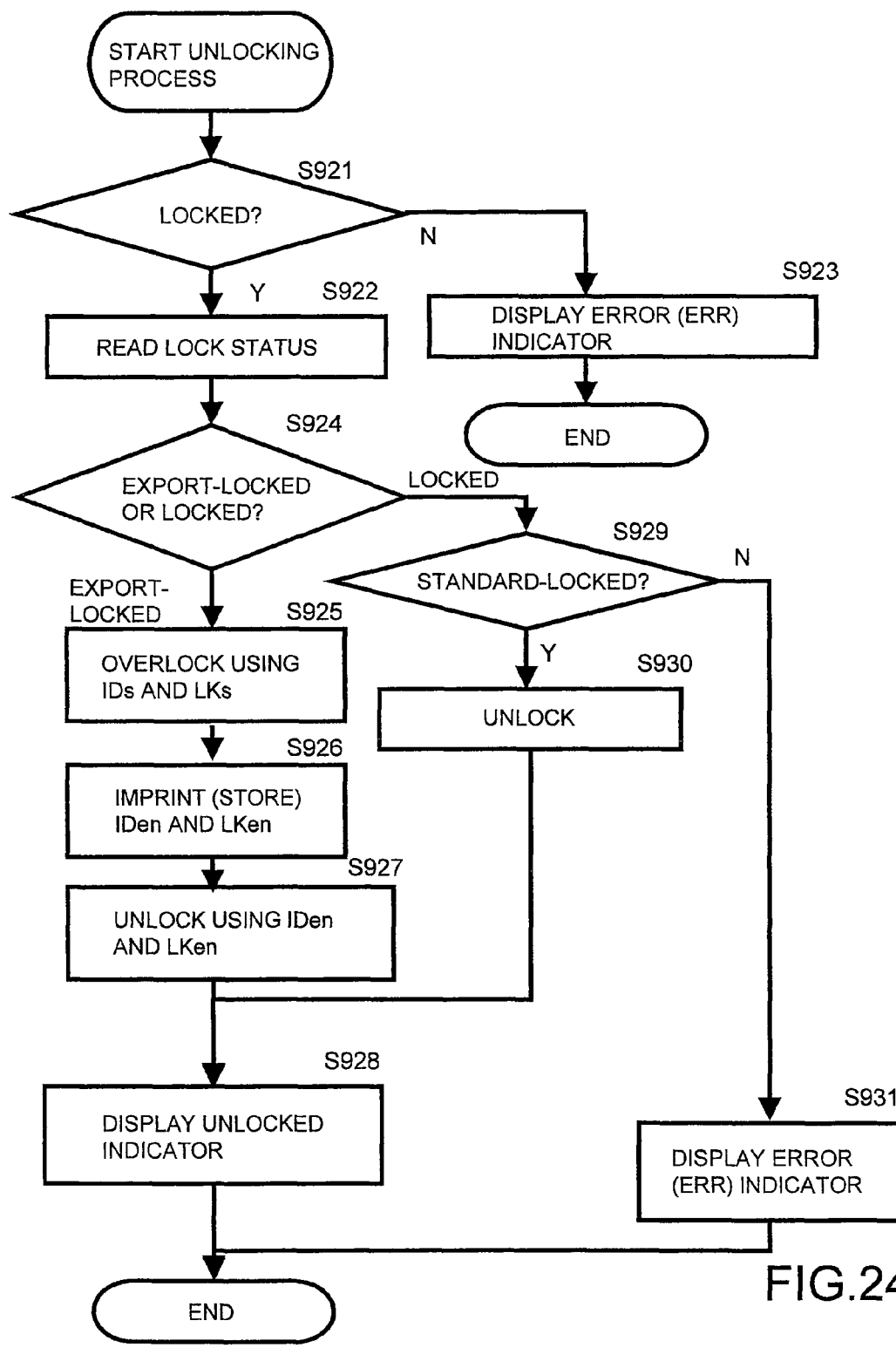
FIG. 24 is a flowchart describing a process performed by the host device when unlocking the information storage device and an indicator displaying process.

Referring to FIG. 24, the operation of the host device when unlocking the information storage device and displaying the indicators will now be described.

Unlocking is performed by pressing the Unlock request switch 731 of FIG. 21. By pressing the Unlock request switch, the lock status of the information storage device is detected. The status detection is performed on the basis of the above-described lock status flags in the RAM in the controller. When the information storage device is unlocked (No in step S921), in step S923, the error (ERR) indicator 724 is displayed.

In step S922 in which the lock status is read, it is determined whether the information storage device is export-locked or standard-locked. On the basis of the above-described lock status flags, it is determined whether the information storage device is export-locked or standard-locked. On the basis of the determination result, one of the indicators 721 to 724 associated with the lock status, which are shown in FIG. 21, is turned on.

When the information storage device is export-locked (Yes in step S924), imprinting and unlocking, which have been described with reference to FIGS. 16 to 18, are performed. That is, in step S925, overlooking is performed by applying the primary ID (IDs) and the primary lock key (LKs). In step S926, imprinting (receiving and storing) of the sub ID (IDen) and the sub lock key (LKen) is performed. In step S927, unlocking is performed by applying the sub ID (IDen) and the sub lock key (LKen). These processes have been described in detail with reference to FIGS. 16 to 18. Accordingly, the lock is released. In step S928, the Unlocked indicator 721 is displayed.

When it is determined in step S924 that the lock status is other than export locking, that is, the lock status indicates standard locking, in step S929, it is determined whether the information storage device is standard-locked. When the information storage device is standard-locked, in step S930, unlocking is performed. The key set applied to unlocking is the primary key set [IDs, LKs] or, in the case of group locking, the sub key set [IDen, LKen]. When the lock is released, in step S928, the Unlocked indicator 721 is displayed.

When it is determined in step S924 that the lock status is other than export locking and when it is determined in step S929 that the information storage device is not standard-locked, in step S931, the error (ERR) indicator 724 is displayed.

Although the present invention has been described in detail with reference to the specific embodiment, it is clear that modifications and substitutions can be made by those skilled in the art without departing from the scope of the present invention. In other words, the present invention has been described with examples and should not be interpreted in a restrictive sense. The scope of the present invention is to be determined solely by the claims described in the beginning.

A series of processes described in the specification can be performed by hardware or software or both. When the processes are performed by software, a program recording the sequence of processes is installed on a memory in a built-in computer included in dedicated hardware and executed. Alternatively, the program may be installed on a general computer capable of performing various processes and executed.

For example, the program can be recorded in advance on a hard disk or a ROM (Read Only Memory) serving as a computer readable recording medium. Alternatively, the program may be stored (recorded) temporarily or permanently on a removable computer readable recording medium, such as a flexible disk, a CD-ROM (Compact Disc Read Only Memory), an MO (Magneto optical) disk, a DVD (Digital Versatile Disc), a magnetic disk, or a semiconductor memory. Such a removable computer readable recording medium can be provided as so-called packaged software.

Besides installing the program on the computer from the above-described removable recording medium, the program may be transferred wirelessly from a download site to the computer or transferred by wire via a network, such as the Internet, to the computer. The computer receives the transferred program and installs the program on a built-in recording medium, such as a hard disk.

Various processes described in the specification may not be performed only in time-series mode based on the description, but also in parallel or individual mode, depending on the throughout or necessity of an apparatus performing the processes. The word "system" in the present specification refers to a logical set of a plurality of apparatuses, which are not necessarily contained in a single casing.

Industrial Applicability

As described above, according to the structure of the present invention, an information storage device, such as a memory card, determines whether (a) a standard lock key set serving as a key set prohibiting output or (b) an export lock key set serving as a key set permitting output is detected in accordance with a lock command input from an information processing apparatus serving as a host device, such as a PC, and stores corresponding key set information. Only when the export lock key set is detected, output is permitted provided that predetermined verification succeeds. A plurality of valid information processing apparatuses is only permitted to lock or unlock a memory.

According to the structure of the present invention, memory access control is performed on the basis of lock status information based on which it is determined whether the information storage device is standard-locked or export-locked. Only when the information storage device is export-locked, the key set can be output. Depending on the use of the memory, various types of memory access control can be performed.

According to the structure of the present invention, when the export lock key set is output to the information processing apparatus, verification is performed on a key set unique to the information processing apparatus, which is input from the information processing apparatus. At least provided that the verification succeeds, the key set can be output. Unlimited memory access is prevented, and secure memory access control is achieved.

According to the structure of the present invention, a primary key set [IDs, LKs] consisting of a primary ID (IDs) serving as a unique ID of the information processing apparatus and a primary lock key (LKs) serving as a lock key associated with the unique ID and a sub key set [IDen, LKen] consisting of data set of a sub ID (IDen) that can be applied to export locking and a sub lock key (LKen) associated with the sub ID (IDen) are stored in the information processing apparatus. Depending on a process, the key set to be applied is changed, thereby easily implementing memory access control in accordance with the process.

The invention claimed is:

1. An information storage device comprising:
   a memory in which data can be stored; and
   a controller which controls access to the memory, wherein,
      the controller locks the memory on the basis of a lock command, an identifier (ID), and a lock key, each of which is input from a first information processing apparatus, the ID identifying the first information processing apparatus, the lock command corresponding to one of a plurality of locking modes, each locking mode corresponding to a respective locked state limiting all access to the memory to one of a primary information processing apparatus having a primary lock key used by the controller to standard lock the memory when the memory is not otherwise export-locked or a plurality of other information processing apparatuses, where the plurality of other information processing apparatuses and the primary information processing apparatus define a group, at least one of the group having a sub lock key used by the controller to export lock the memory to limit all access to the memory to each information processing apparatus in the group that transmits an unlock command to the controller using the sub lock key, and the controller determines, on the basis of the locking mode corresponding to the lock command, whether a key set including the identifier (ID) and the lock key is
  (a) a standard lock key set serving to prohibit output of the key set and prohibit all access to the memory except to the primary information processing apparatus, where the first information processing apparatus is the primary information processing apparatus and the lock key is the primary lock key for standard locking the memory, or
  (b) an export lock key set serving to permit output of the key set to a corresponding one of the information processing apparatuses in the group and prohibit all access to the memory except to each information processing apparatus in the group that has unlocked the memory via the controller using the lock key, where the lock key is the sub lock key for export locking the memory, and
stores determination information in a storage means.

2. The information storage device according to claim 1, wherein:
the information storage device stores lock status information in the storage means, the lock status information serving as determination information based on which the lock status of the information storage device is determined,
the lock status information includes information based on whether the information storage device is standard-locked or export-locked, and
the controller outputs, on the basis of the lock status information, the export lock key set to the information processing apparatus provided that the information storage device is export-locked.

3. The information storage device according to claim 1, wherein:
the controller determines whether it is permitted to output the export lock key set to a second information processing apparatus, and
the determination includes verification of a key set unique to the information processing apparatus, which is input from the second information processing apparatus, and the export lock key set is output to the second information processing apparatus at least provided that the verification succeeds.

4. An information storage device comprising:
a memory in which data can be stored; and
a controller which controls access to the memory, wherein:
  (1) the controller locks the memory on the basis of a lock command, an identifier (ID), and a lock key, each of which is input from a first information processing apparatus, the ID identifying the first information processing apparatus, the lock command corresponding to one of a plurality of locking modes, each locking mode corresponding to a respective locked state limiting all access to the memory to one of a primary information processing apparatus having a primary lock key used by the controller to standard lock the memory when the memory is not otherwise export-locked or a plurality of other information processing apparatuses, where the plurality of other information processing apparatuses and the primary information processing apparatus define a group, at least one of the group having a sub lock key used by the controller to export lock the memory to limit all access to the memory to each information processing apparatus in the group that transmits an unlock command to the controller using the sub lock key, and
  (2) the controller determines, on the basis of the locking mode corresponding to the lock command, whether a key set including the identifier (ID) and the lock key is
    (a) a standard lock key set serving as a key set prohibiting output of the key set and prohibiting access to the memory except to the primary information processing apparatus, where the first information processing apparatus is the primary information processing apparatus and the lock key is the primary lock key for standard locking the memory, or
    (b) an export lock key set serving to permit output of the key set to a corresponding one of the information processing apparatuses in the group and prohibit all access to the memory except to each information processing apparatus in the group that has unlocked the memory via the controller using the lock key, where the lock key is the sub lock key for export locking the memory, and stores determination information in storage means,
  (3) the primary information processing apparatus has, serving as a unique key set, a primary key set [IDs, LKs] consisting of a primary ID (IDs) serving as a unique ID of the primary information processing apparatus and a the primary lock key (LKs) defined in association with the primary ID (IDs), and
  (4) in response to an export-lock-key-set output request from the primary information processing apparatus, the controller encrypts data of the export lock key set on the basis of the primary lock key (LKs) held by the primary information processing apparatus and outputs the encrypted data to the primary information processing apparatus.

5. The information storage device according to claim 4, wherein the export lock key set is a sub key set [IDen, LKen] consisting of a data set of a sub ID (IDen) input as the identifier (ID) from the information processing apparatus having performed export locking and the lock key is the sub lock key (LKen) defined in association with the sub ID (IDen), and the controller encrypts the sub lock key (LKen) on the basis of the primary lock key (LKs) held by the primary information processing apparatus having made a sub-key-set output request and outputs encrypted data [E(LKs, LKen)].

6. A memory access control system comprising:
an information storage device including a memory in which data can be stored, and a controller which controls access to the memory and a first information processing apparatus including an interface with the information storage device and accessing the memory in the information storage device via the interface, wherein,
the information processing apparatus stores a key set including an identifier (ID) and a lock key (LK) in storage means,
the controller of the information storage device performs locking of the memory on the basis of a lock command, an identifier (ID), and the lock key, each of which is each input from the first information processing apparatus, the ID identifying the first information processing apparatus, the lock command corresponding to one of a plurality of locking modes, each locking mode corresponding to a respective locked state limiting all access to the memory to one of a primary information processing apparatus having a primary lock key used by the controller to standard lock the memory when the memory is not otherwise export-locked or a plurality of other information processing apparatuses, where the plurality of other information processing apparatuses and the primary information processing apparatus define a group, at least one of the group having a sub lock key used by the controller to export lock the memory to limit all access to the memory to each information processing apparatus in the group that transmits an unlock command to the controller using the sub lock key,
the controller of the information storage device determines, on the basis of the locking mode corresponding to the lock command, whether the key set including the identifier (ID) and the lock key is
(a) a standard lock key set serving to prohibit output of the key set and prohibit access to the memory except to the primary information processing apparatus, where the first information processing apparatus is the primary information processing apparatus and the lock key is the primary lock key for standard locking the memory, or
(b) an export lock key set serving to permit output of the key set to a corresponding one of the information processing apparatuses in the group and prohibit all access to the memory except each information processing apparatus in the group that has unlocked the memory via the controller using the lock key, where the lock key is the sub lock key for export locking the memory, and stores determination information in storage means, and on the basis of the determination information, the controller of the information storage device determines whether it is permitted to output the key set to another one of the information processing apparatus in the group.

7. A memory access control system comprising:
an information storage device including a memory for storing data and a controller for performing access control on the memory;
a first information processing apparatus including an interface to the information storage device and adapted to access the memory in the information storage device,
a second information processing apparatus including an interface to the information storage device and adapted to access the memory in the information storage device,
wherein,
the first information processing apparatus stores a key set including an identifier (ID) and a lock key (LK) in storage means,
the controller of the information storage device performs locking of the memory on the basis of a lock command, the lock key and the identifier (ID) each input from the first information processing apparatus, the ID identifying the first information processing apparatus, the lock command corresponding to one of a plurality of locking modes, each locking mode corresponding to a respective locked state limiting all access to the memory to one of the first information processing apparatus in which the lock key is a primary lock key used by the controller to standard lock the memory when the memory is not otherwise export-locked or a plurality of other information processing apparatuses, where the plurality of other information processing apparatuses and the first information processing apparatus define a group, at least one of the group having a sub lock key used by the controller to export lock the memory to limit all access to the memory to each information processing apparatus in the group that transmits an unlock command to the controller using the sub lock key,
the controller of the information storage device determines, on the basis of the locking mode corresponding to the lock command, whether the key set including the identifier (ID) and the lock key is
(a) a standard lock key set serving to prohibit output of the key set and prohibit all access to the memory except to the first information processing apparatus, where the lock key is the primary lock key for standard locking the memory, or
(b) an export lock key set serving as a key set permitting output of the key set to a corresponding one of the information processing apparatuses in the group and prohibiting all access to the memory except to each information processing apparatus in the group that has unlocked the memory via the controller using the lock key, where the lock key is the sub lock key for export locking the memory, and
stores determination information in storage means, and on the basis of the determination information, the controller of the information storage device determines whether it is permitted to output the key set to the second information processing apparatus, and
wherein, in response to a request from the second information processing apparatus the controller of the information storage device generates another random number and receives, from the second information processing apparatus, encrypted data [E(Lks, Rms)] generated by encrypting the other random number (Rms) on the basis of a primary lock key (LKs) held by the second information processing apparatus, and
the controller of the information storage device performs verification including checking of the received encrypted data against encrypted data [E(Lks, Rms)] computed on the basis of a primary lock key (LKs) obtained by computing a hash value using an identifier of the second information storage device to determine whether the second information processing apparatus is in the group associated with the sub lock key.

8. A memory access control method for an information storage device including a memory for storing data and a controller for performing access control on the memory, the method comprising:
a step of receiving a lock command, an identifier (ID), and a lock key, each of which is input from a first information processing apparatus, the ID identifying the first information processing apparatus, the lock command corresponding to one of a plurality of locking modes, each locking mode corresponding to a respective locked state limiting all access to the memory to one of a primary information processing apparatus having a primary lock key used by the controller to standard lock the memory when the memory is not otherwise export-locked or a plurality of other information processing apparatuses, where the plurality of other information processing apparatuses and the primary information processing apparatus define a group, at least one of the group having a sub lock key used by the controller to export lock the memory to limit all access to the memory to each information processing apparatus in the group that transmits an unlock command to the controller using the sub lock key, and a step of determining, on the basis of the locking mode corresponding to the lock command, whether a key set including the identifier (ID) and the lock key is (a) a standard lock key set serving to prohibit output of the key set and prohibit all access to the memory except to the primary information processing apparatus, where the first information processing apparatus is the primary information processing apparatus and the lock key is the primary lock key for standard locking the memory, or (b) an export lock key set serving to permit output of the key set to a corresponding one of the information processing apparatuses in the group and prohibit all access to the memory except to each information processing apparatus in the group that has unlocked the memory via the controller using the lock key, where the lock key is the sub lock key for export locking the memory, storing determination information in storage means.

9. The memory access control method according to claim 8, wherein the determination information is lock status information serving as lock-status determination information, the lock status information includes information based on whether the information storage device is standard-locked or export-locked, and the memory access control method further comprises a step of outputting, on the basis of the lock status information, the export lock key set to the information processing apparatus provided that the information storage device is export-locked.

10. The memory access control method according to claim 8, wherein, as determination of whether it is permitted to output the export lock key set to a second information processing apparatus, verification is performed on a key set unique to the second information processing apparatus, which is input from the second information processing apparatus, and the export lock key set is output to the second information processing apparatus at least provided that the verification succeeds.

11. A memory access control method for an information storage device including a memory for storing data and a controller for performing access control on the memory, the method comprising:

a step of receiving a lock command, a lock key and identifier (ID) each input from a first-information processing apparatus, the lock command corresponding to one of a plurality of locking modes, each locking mode corresponding to a respective locked state limiting all access to the memory to one of a primary information processing apparatus having a primary lock key used by the controller to standard lock the memory when the memory is not otherwise export-locked or a plurality of other information processing apparatuses, where the plurality of other information processing apparatuses and the primary information processing apparatus define a group, at least one of the group having a sub lock key used by the controller to export lock the memory to limit all access to the memory to each information processing apparatus in the group that transmits an unlock command to the controller using the sub lock key, and a step of determining, on the basis of the locking mode corresponding to the lock command, whether a key set including the identifier (ID) and the lock key is (a) a standard lock key set serving to prohibit output of the key set and prohibit all access to the memory except to the primary information processing apparatus, where the first information processing apparatus is the primary information processing apparatus and the lock key is the primary lock key for standard locking the memory, or (b) an export lock key set serving to permit output of the key set to a corresponding one of the information processing apparatuses in the group and prohibit all access to the memory except to each information processing apparatus in the group that has unlocked the memory via the controller using the lock key, where the lock key is the sub lock key for export locking the memory, storing determination information in storage means, and wherein a second information processing apparatus has, serving as a unique key set, a primary key set [IDs, LKs] consisting of a primary ID (IDs) serving as a unique ID of the second information processing apparatus and a primary lock key (LKs) defined in association with the primary ID (IDs), and the memory access control method further comprises an encryption and output step of encrypting, in response to an export-lock-key-set output request from the second information processing apparatus, data of the export lock key set on the basis of the primary lock key (LKs) held by the second information processing apparatus identifying the second information processing apparatus as being in the group and outputting the encrypted data.

12. The memory access control method according to claim 11, wherein the export lock key set is a sub key set [IDen, LKen] consisting of a data set of a sub ID (IDen) input as the identifier (ID) from the first information processing apparatus having performed export locking and the lock key set is the sub lock key (LKen) defined in association with the sub ID (IDen), and the encryption and output step is a step of encrypting the sub lock key (LKen) on the basis of the primary lock key (LKs) held by the second information processing apparatus having made a sub-key-set output request and outputting encrypted data [E(LKs, LKen)].

13. A non-transitory computer-readable recording medium containing a program for controlling an information storage device to perform a method for controlling memory access to the information storage device, the information storage device including a memory for storing data and a controller for performing access control on the memory, the program comprising:

a step of receiving a lock command, an identifier (ID), and a lock key, each of which is input from a first information processing apparatus, the lock command corresponding to one of a plurality of locking modes, each locking mode corresponding to a respective locked state limiting all access to the memory to one of the primary information processing apparatus having a primary lock key used by the controller to standard lock the memory when the memory is not otherwise export-locked or a plurality of other information processing apparatuses, where the plurality of other information processing apparatuses and the primary information processing apparatus define a group, at least one of the group having a sub lock key used by the controller to export lock the memory to limit all access to the memory to each information processing apparatus in the group that transmits an unlock command to the controller using the sub lock key, and a step of determining, on the basis of the locking mode corresponding to the lock command, whether a key set including the identifier (ID) and the lock key is (a) a standard lock key set serving to prohibit output of the key set and prohibit all access to the memory except to the primary information processing apparatus, where the first information processing apparatus is the primary information processing apparatus and the lock key is the primary lock key for standard locking the memory, or (b) an export lock key set serving to permit output of the key set to a corresponding one of the information processing apparatuses in the group and prohibit all access to the memory except to each information processing apparatus in the group that has unlocked the memory via the controller using the lock key, where the lock key is the sub lock key for export locking the memory, and storing determination information in storage means.

* * * * *